Inventors
Adelbert W. Rockwell Jr.
Edward F. Mitchell
By their Attorney
Carl E. Johnson.

Feb. 27, 1962 A. W. ROCKWELL, JR., ETAL 3,022,527

MACHINES FOR SHAPING UPPERS OVER LASTS

Filed Jan. 22, 1959 13 Sheets-Sheet 3

Feb. 27, 1962 A. W. ROCKWELL, JR., ET AL 3,022,527

MACHINES FOR SHAPING UPPERS OVER LASTS

Filed Jan. 22, 1959 13 Sheets-Sheet 4

MACHINES FOR SHAPING UPPERS OVER LASTS

Feb. 27, 1962 A. W. ROCKWELL, JR., ET AL 3,022,527

MACHINES FOR SHAPING UPPERS OVER LASTS

Filed Jan. 22, 1959 13 Sheets-Sheet 6

Feb. 27, 1962 A. W. ROCKWELL, JR., ETAL 3,022,527

MACHINES FOR SHAPING UPPERS OVER LASTS

Filed Jan. 22, 1959 13 Sheets-Sheet 7

Feb. 27, 1962 A. W. ROCKWELL, JR., ETAL 3,022,527

MACHINES FOR SHAPING UPPERS OVER LASTS

Filed Jan. 22, 1959 13 Sheets-Sheet 9

Feb. 27, 1962 A. W. ROCKWELL, JR., ETAL 3,022,527

MACHINES FOR SHAPING UPPERS OVER LASTS

Filed Jan. 22, 1959 13 Sheets-Sheet 11

3,022,527
Patented Feb. 27, 1962

3,022,527

MACHINES FOR SHAPING UPPERS OVER LASTS

Adelbert W. Rockwell, Jr., and Edward F. Mitchell, Beverly, Mass., assignors to United Shoe Machinery Corporation, Flemington, N.J., a corporation of New Jersey Filed Jan. 22, 1959, Ser. No. 788,396
29 Claims. (Cl. 12—8.5)

This invention relates to machine for shaping uppers over last, and more particularly to shoe machines of the type designed for performing a pulling-over operation and for thereafter lasting at least the toe ends of the uppers. As herein illustrated the invention is embodied in a machine for operating on shoes the margins of the uppers of which are lasted in parallel relation to the bottoms of their lasts and which is of less complicated construction than that disclosed, for instance, in United States Letters Patent No. 2,703,420, granted March 8, 1955 on an application filed in the name of Sidney J. Finn. In certain respects this invention is thus especially well adapted for use on women's and children's shoes, the uppers of which may be unlined and have precemented marginal portions to be secured to an insole on a last. It is to be understood, nevertheless, that the various novel features of this invention are not limited in use to shoe machines of the type herein illustrated, nor to the manufacture of any specific kind or style of shoe.

As is well known in the shoemaking art, character is imparted to a shoe primarily in the major steps of initially positioning an insole and upper properly on its last, conforming the forepart of the upper to the lines of the last, and then securing the marginal portions of the forepart of the upper after it has been conformed to the last. In initially assembling an upper on its last, the heel end of the upper customarily is temporarily secured to the last as by a tack though in some instances the last and its upper are initially held assembled by hand only. Then means, specifically a plurality of hydraulically operated forepart grippers in the case of the Finn machine mentioned above, is normally employed to pull the margin of the upper beyond the toe and thus tension the upper heightwise of the last preparatory to the forepart lasting operation wherein wipers act to wipe the tensioned margin of the upper inwardly over the insole. To be of optimum value it is of course essential that a machine of the type under consideration be extremely versatile in operation, i.e., be capable of operating with ease and rapidity upon a large range of sizes, styles and materials in footwear. This necessarily entails, among other things, a high degree of control over the instrumentalities for tensioning and for lasting the upper stock, the quality, strength and stretch of which are known to vary, in many instances unpredictably, so that for uniformly good shoemaking the best manipulation and judgment of an operator need to be supplemented by controls built into the machine for automatic operation in response to the differing working conditions encountered. For actuating the operating instrumentalities of the illustrated machine advantageously and in improved, variable timing sequence, especially those gripping and wiping means controlling the lasting margin and needing a degree of latitude in their individual and overlapping functions, it has been discovered that proper use of inherently yieldable power means such as is characterized by air operated piston-cylinder devices, for example, as contrasted for instance with hydraulically driven means, can provide this desired automatic exercise of "discretion" and thus assist the operator in obtaining consistently high quality shoemaking.

In view of the foregoing it is a primary object of this invention to provide an improved fluid operated lasting machine which shall be uncomplicated and relatively inexpensive and yet capable of conforming at least the toe portions of a large variety of upper materials properly to their lasts with only moderate effort on the part of an operator. To this end the machine in which the invention is herein shown as embodied includes in its air-powered organization a novel distributor, preferably sectional in form, arranged in U-shape to engage the margin of the upper, of a shoe to be lasted, in different locations around the toe end of a last and at the sides of the forepart beyond the toe. A central or extreme toe end portion of the distributor is initially disposed to be engaged by the toe end face of the last when the last is presented horizontally and bottom down, together with its upper and an insole thereon, to the machine, the lengthwise position of the last being thus determined. For positioning the last heightwise at this stage a vertically movable shoe rest comprises individually adjustable members respectively arranged to engage the insole margin at the toe end and at substantially opposite ends of the ball line. In placing the last on these rest members, which preferably are inwardly displaceable, an operator will see that the margin of the upper extends over the several portions of the distributor and into a gap beneath the wipers which are adapted ultimately to operate in a plane to wipe the lasting margin of the forepart of the upper inwardly beneath the insole. In addition to the centralized toe end section, the distributor illustrated herein includes at each side thereof a section sometimes termed a "dog ear," and rearwardly of each dog ear section is a side distributor section herein illustrated as formed additionally to act as a gripper. The machine is further provided rearwardly of each side distributor-gripper with a floating pair of pincers arranged to grip and toewardly tension the upper stock in the vicinity of the ball. The respective distributor sections are operable heightwise by air-driven piston-cylinder devices, the side distributor-grippers being initially closed and pulled forwardly, i.e. towards the toe, by a similar device to provide a forward draft of the upper usually to the extent permitted by their engagement with the rearward edges of the dog ear distributors. With the upper stock thus forwardly tensioned, and in response to the forward movement of the distributor-grippers, the shoe rest, the entire distributor, and a novel margin detector preferably arranged at the extreme toe end thereof are moved heightwise by air pressure lightly to clamp the margin against the under surface of the wipers. The mounting of the distributor-grippers is such that while gripping the upper they are yieldingly swingable inwardly toward the sides of the last in response to resistance of the upper materials to stress exerted thereon, first by the distributor-grippers and then subsequently by the wipers additionally in moving laterally. Next in the operating sequence the shoe rest is independently further moved heightwise to force the last, in response to air pressure, upwardly.

In the course of the further upward movement of the shoe rest the distributor gradually releases the lightly clamped marginal stock until an edge thereof at the toe end passes over and thereby trips the above-mentioned margin detector to actuate a switch which allows air to enter a cylinder at a higher pressure for positively clamping the lasting margin, as thus predetermined, between the distributor and the wipers against further withdrawal from beneath the open wipers. The detector may be selectively adjusted to provide predetermined widths of lasting margin. As the shoe thereafter reaches the end of its upward travel, a microswitch is actuated which allows air to enter a cylinder arranged to operate a heel engaging clamp. Thereupon a toe pad, also air operated, is brought into contact with the toe at an initially light pressure that is ultimately increased for bedding down purposes. Air under pressure is now automatically admitted to actuate wiper-operating cylinders and, regardless of the width of the particular shoe being lasted, after wiper engagement with the tensioned margin and consequent resistance to in-wiping, as soon as the wipers pass the insole edge in the vicinity of the tip line, air is exhausted from the distributor-gripper operating cylinders gradually to diminish their effective pressure and thus allow side-gripper release and retraction. Air is simultaneously also partially exhausted from the toe distributor operating cylinder to permit in-wiping. Control of the tensioned marginal stock as it is being wiped and de-wrinkled in accordance with this important feature is thus gradually transmitted from the distributor to the wipers and, as they complete their inward wiping, the toe and dog ear distributors and the toe rest are released from their shoe engaging positions. When inward wiping is completed, bedding down pressure is applied by the toe pad. A final period of wiper dwell normally ensues for an interval which is adjustably determined by a timing means and appropriate to the cement being employed. At the end of this dwell, or at any point in the cycle, the operator may by manually controlled means return the parts to their starting positions and the shoe will drop into a conveniently arranged receptacle.

As hitherto constructed, in the course of their closing movement articulated toe wipers commonly pivot at the toe end and leave a gap or openings between them in this vicinity thus permitting the lasting margin at the toe end to remain partially unwiped and/or without the benefit of bedding down pressure. As another feature of this invention the illustrated machine further comprises an auxiliary toe wiper constructed and arranged in relation to the main wipers, which preferably are heated and initially adjustable widthwise, to move inwardly relatively thereto and thus maintain a continuous wiper operating plane all around the toe and avoiding the possibility of any marginal portion of the upper stock from evading bedding down pressure.

The above and other features of the invention, including novel details of construction and arrangements of parts, will now be more particularly described in connection with an illustrative machine in which they are embodied and with reference to the accompanying drawings thereof; in which FIG. 1 is a perspective view of an air-powered pulling over and forepart lasting machine;

Figure 22:
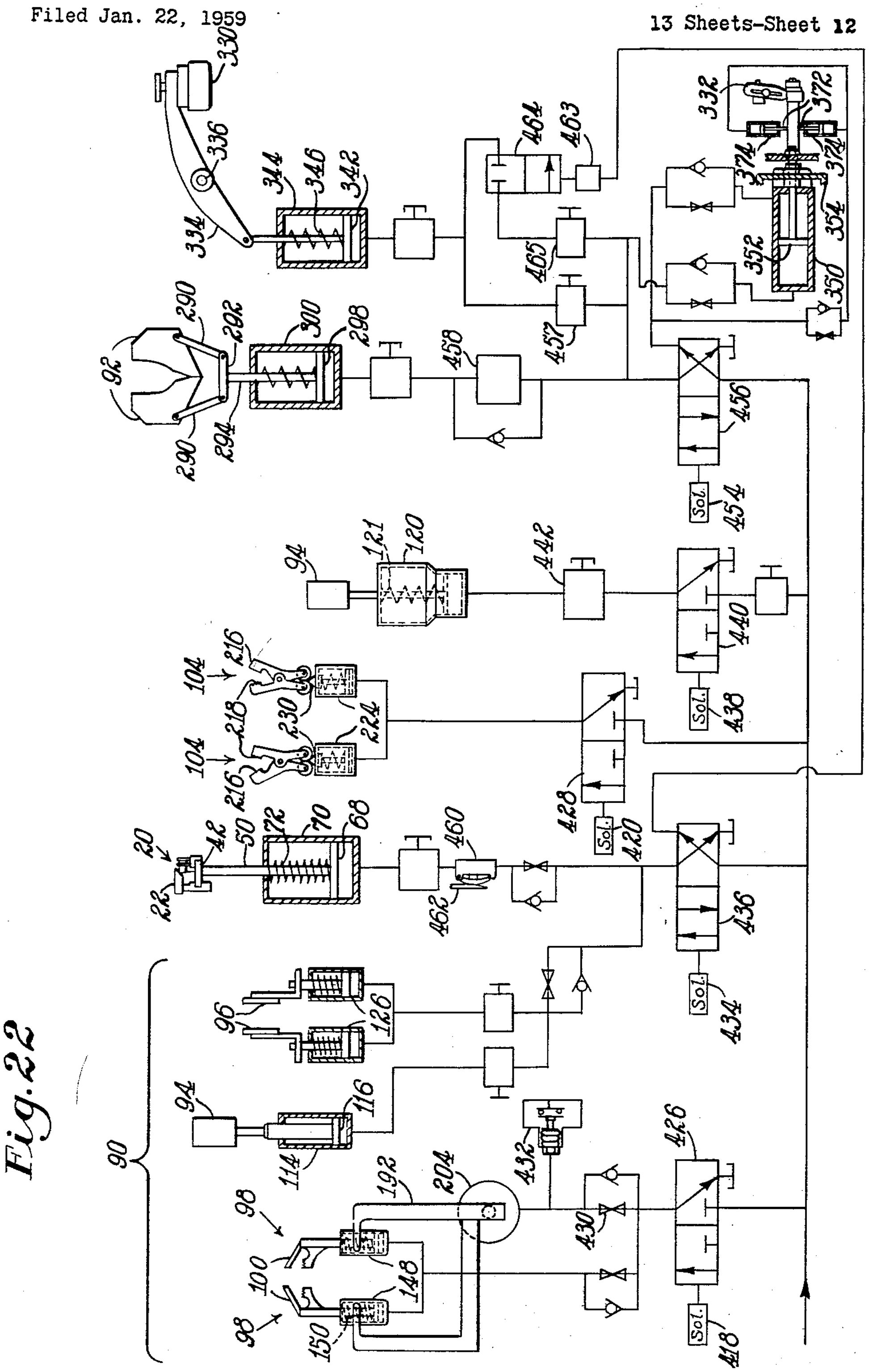

FIGS. 18 to 21, inclusive, are schematic step views indicating the manner in which the upper is shaped over its shoe bottom;

FIG. 22 is a diagram of a pneumatic control mechanism; and

Figure 23:
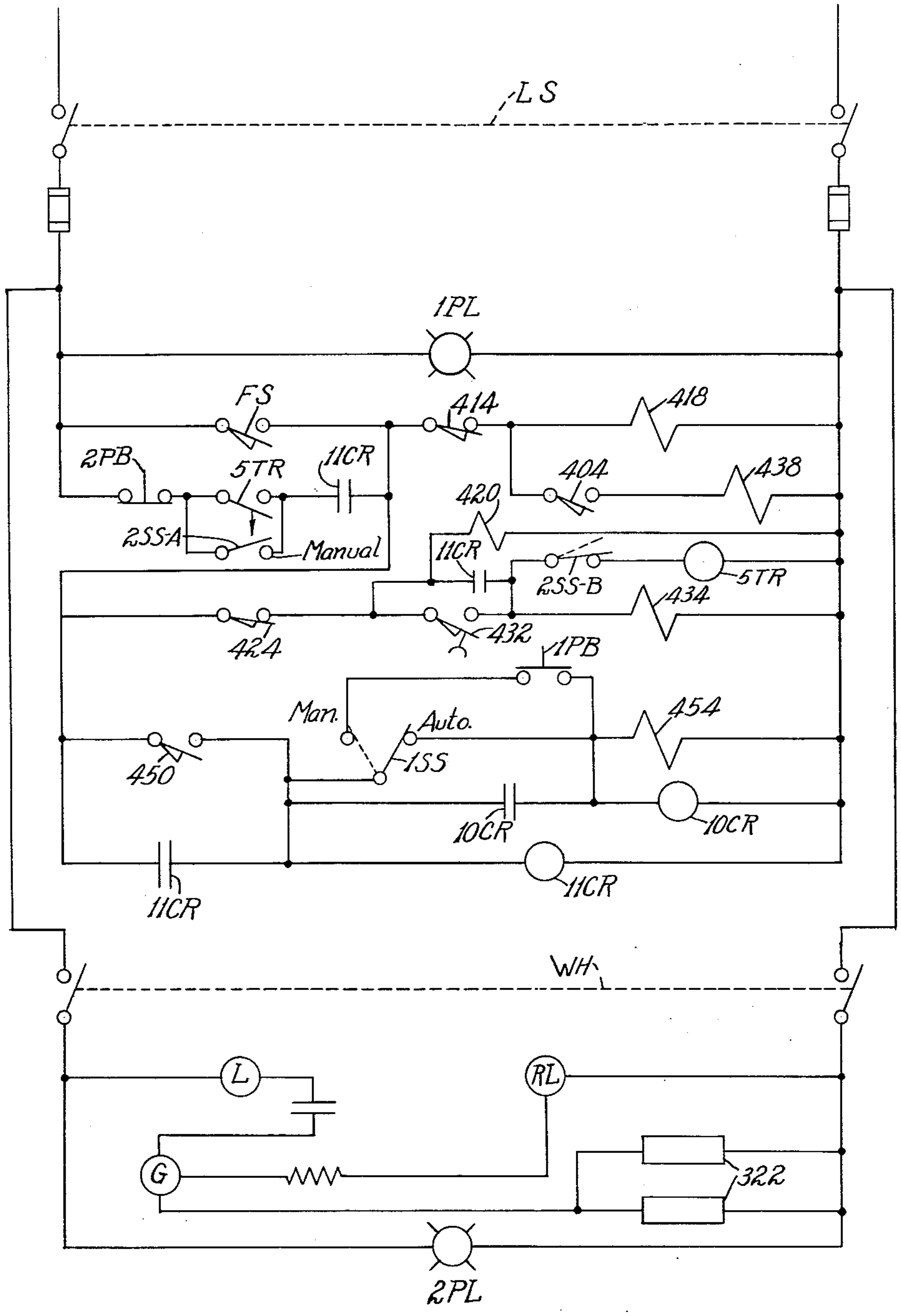

FIG. 23 is an electrical diagram of the controls of the machine.

Preferably, and as herein illustrated and described, the invention is embodied in a single-station machine adapted to operate on both right and left shoes, but it is contemplated that, if found preferable in order to meet special requirements, the invention may be embodied in a twin machine having two sets of instrumentalities with their respective operating and controlling means, these sets being independent of one another in operation and respectively adapted to operate on rights and/or lefts.

Figure 1:
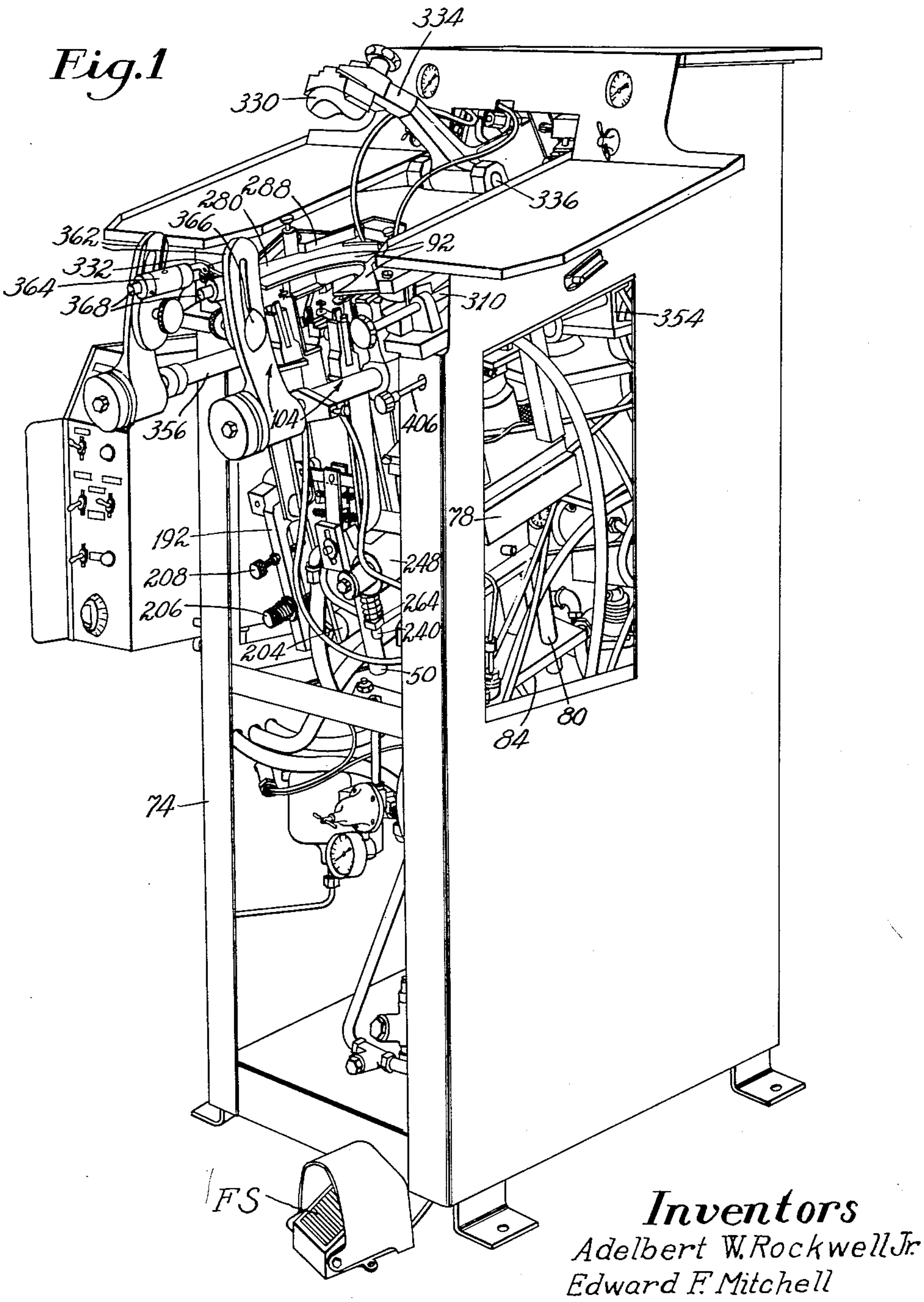
Figure 2:
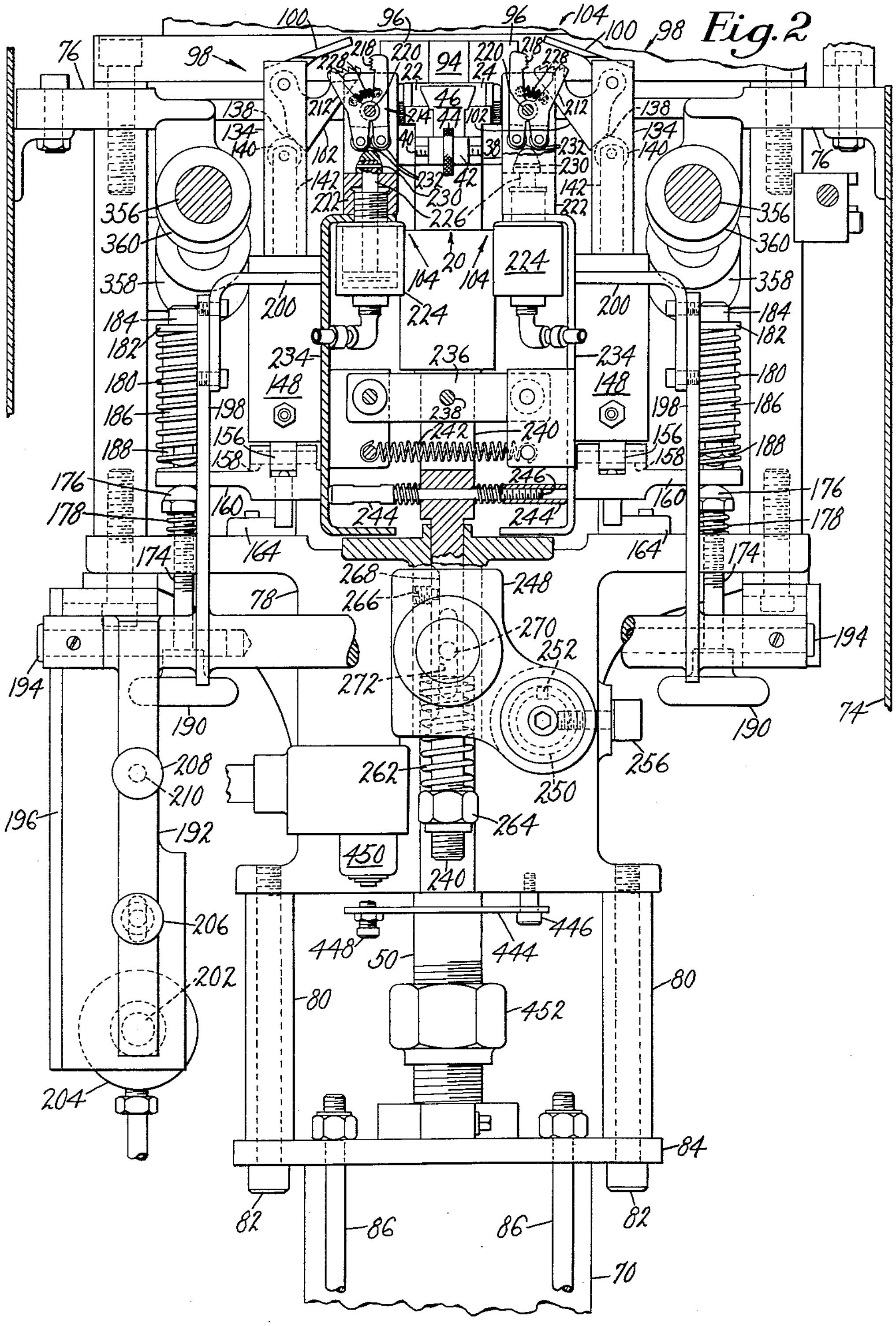
FIG. 2 is a view substantially in front elevation of the machine of FIG. 1 (looking parallel to the operating plane of wipers) with portions broken away to reveal construction details, the parts being in their rest positions.
Figure 3:
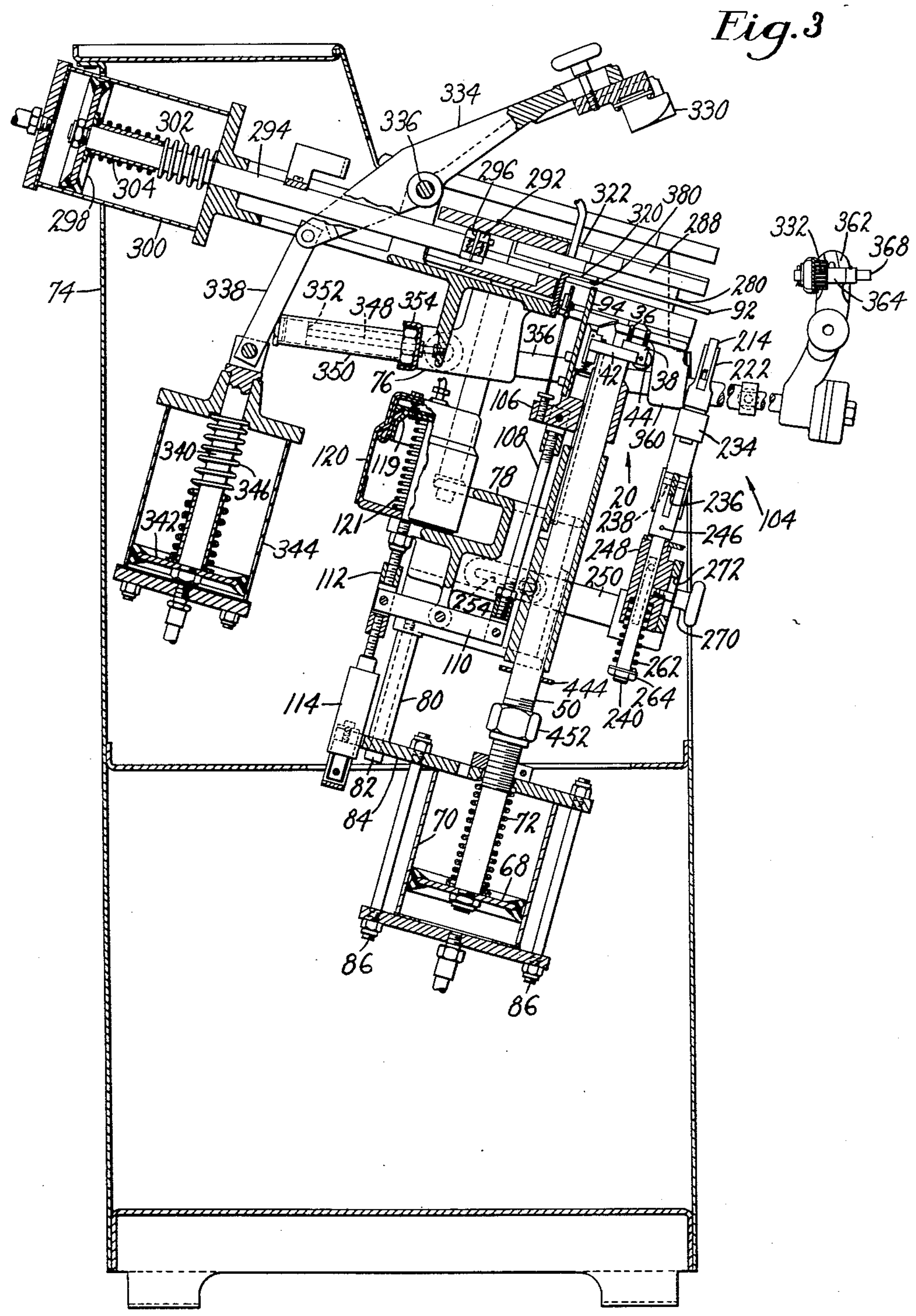
FIG. 3 is a vertical section taken on a plane extending fore and aft of the machine and indicating principal operating instrumentalities.
Figure 4:
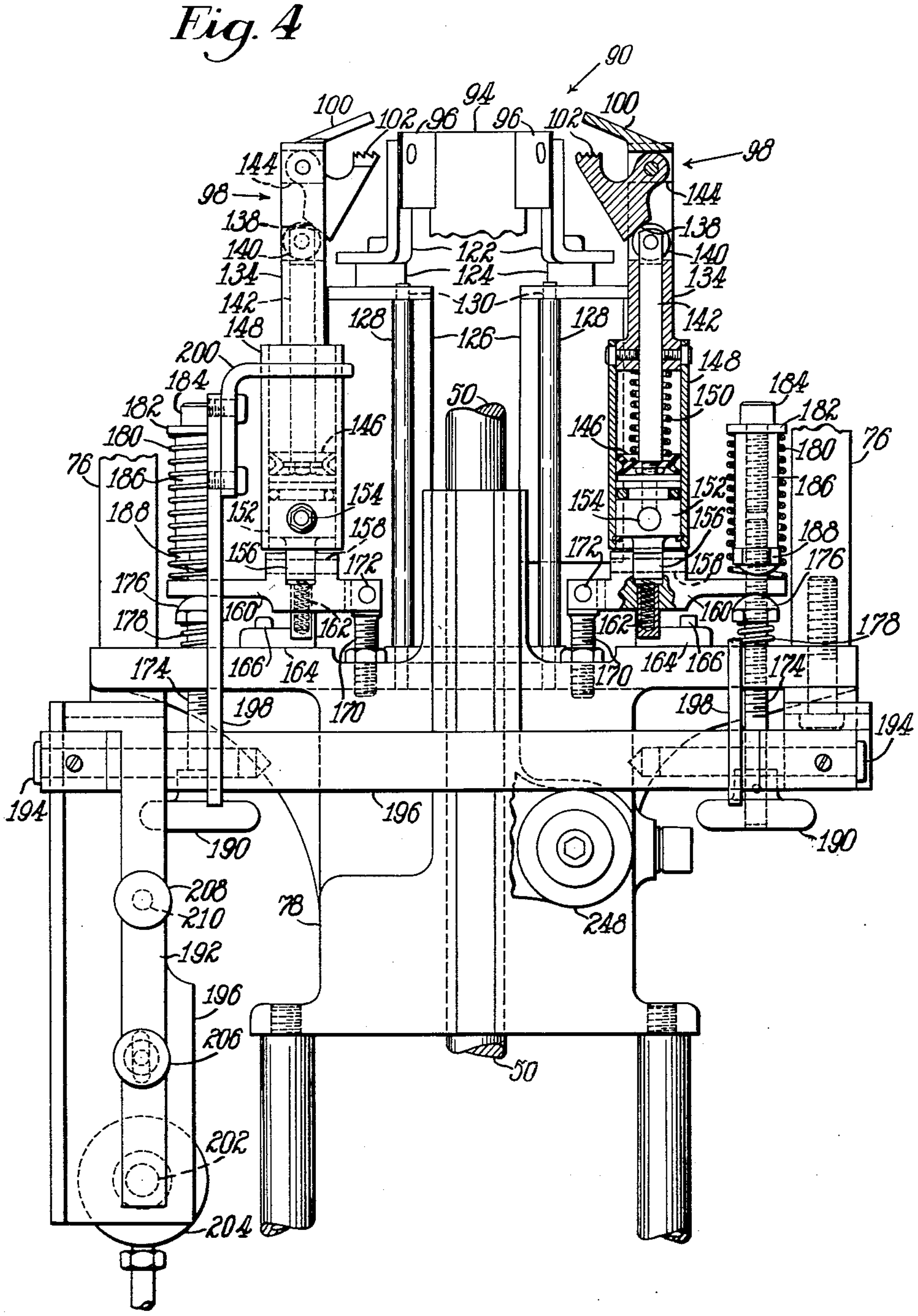
FIG. 4 is a view similar to FIG. 2 with certain parts omitted and others detailed to indicate mounting of distributor means, particularly distributor-grippers.

The machine is provided with a vertically movable shoe rest, generally designated 20 (FIGS. 2, 3, 5, 10 and 11) for positioning heightwise the forepart of a last L presented with an upper U and an insole I assembled thereon (the upper and the insole hereinafter being referred to inclusively as the shoe). This rest is provided at its apex with arcuate insole engaging supports 22, 24 pivotal on a normally vertical pin 26 (FIGS. 10 and 11) carried by a block 28 mounted as later described, the pin being detachably anchored to the block by one leg of a U-shaped wire 30. The supports 22, 24 are yieldingly urged to assume their normal spread-apart positions by a compression spring 32 nested in coaxial bores formed therein, a strap 34 secured to the support 24 serving to retain the spring 32. In their spread-apart positions the supports 22, 24 are disposed to engage the insole at its toe end along the margin thereof. For engaging the insole margin substantially in the vicinity beneath the opposite ends of the tip line, a pair of upstanding, capped compression springs 36, 36 have their lower ends secured in each of a pair of blocks 38, 38 the unsecured caps of the springs thus being laterally yieldable inwardly of a shoe bottom while engaging the insole. To enable the rest 20, which is of generally triangular shape, properly to accommodate a range of sizes and styles of shoes with respect to the operating instrumentalities, these springs are also bodily adjustable widthwise by means now to be explained. A horizontal widthwise stud 40 (FIGS. 10, 11) rotatably extends through spaced bores formed coaxially in a base block 42 of the rest and is formed with threads of opposite hand for threadedly receiving the blocks 38, respectively. Accordingly, a knurled disk 44 fixed to the stud 40 and confined between the bored portions of the base block 42 may be turned to move the blocks 38 inwardly or outwardly as desired. Each block 38 is L-shaped in section and hence guided for widthwise sliding movement relatively to adjacent abutting surfaces of the block 42 to which a top, central block 46 is secured by a cap screw 48 which also serves to anchor the rest 20 on the upper end of a vertically movable lasting post 50 (FIGS. 1, 2, 4).

It is of importance, especially if the insole be thin or of flimsy stock, to insure that the insole margin, particularly at the toe extremity, be held in flat, unbuckled relation against the last bottom during conformance of the upper to the last and at that critical interval when the margin of the upper is to be worked over the edge of the insole. As herein shown in FIG. 12, the supports 22, 24 accordingly are swingable inwardly, in response to lasting forces exerted through the margin, about the axis of the pin 26, and inwardly and downwardly about an axis extending widthwise to an out-of-the-way position. For this purpose the block 28 is pivotally carried on a horizontal pin 52 mounted in the upper end of a member 54 vertically bored to house a plunger 56. The member 54 is slidable heightwise in a T-slot formation in the block 46. A compression spring 58 in the member 54 bears at its upper end against the plunger 56 which is thus urged yieldingly upward against a rounded projection 60 of the block 28, and when the supports 22, 24 have been tilted inwardly, the influence of the spring is to return them to their normal upright position. This latter position is adjustably determined by a setscrew 62 projecting from the block 46 for engagement with the member 54. The lower end of the spring 58 abuts a bracket 64 secured by a cap screw 66 to the lasting post 50.

Figure 6:
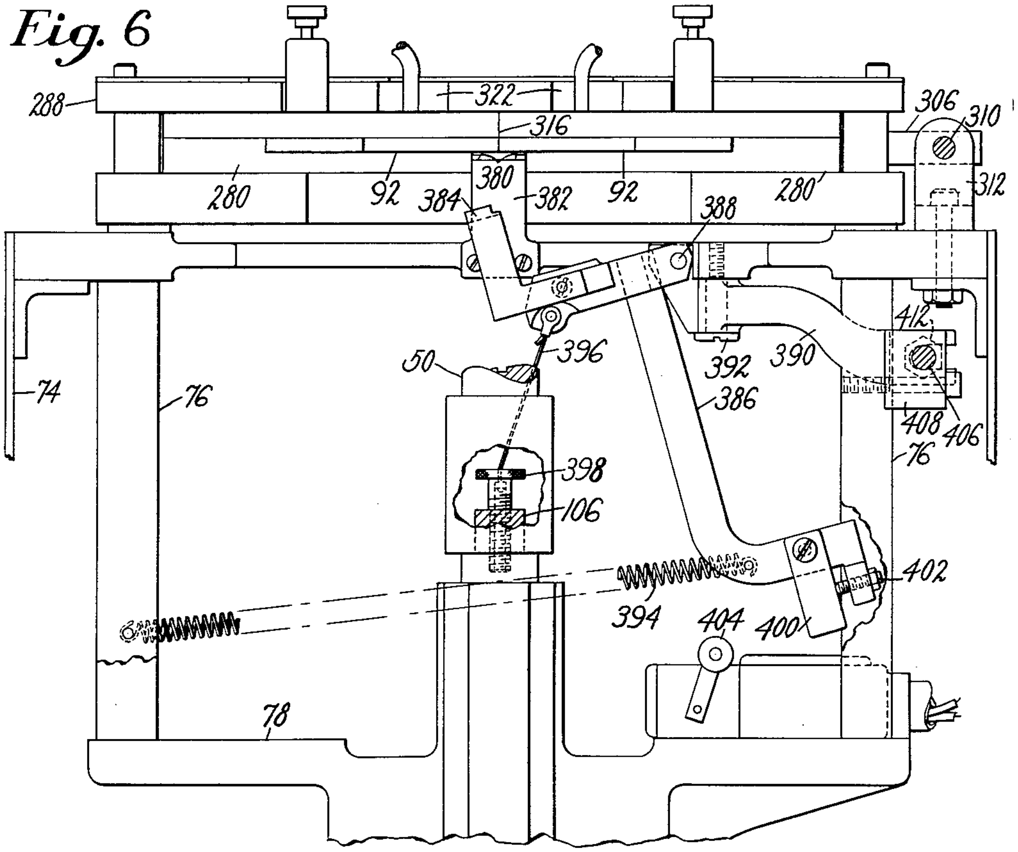
FIG. 6 is a view in front elevation showing the mounting of the wipers and margin detecting mechanism.

For convenience in presenting the shoe bottom down to the machine, the just described insole engaging parts of the rest 20 lie in a general plane inclined upwardly and away from the operator, the rest being carried heightwise on the upper end of the lasting post 50 to the lower end of which is secured a piston 68 (FIGS. 3, 22) within an operating cylinder 70. This, and nearly all other piston cylinder devices hereinafter to be mentioned, are preferably yieldingly actuated in one direction by air under pressure against the resistance of a return spring, the latter being designated 72 in the case of the cylinder 70. In order to house and support the shoe rest 20 and various other instrumentalities and control mechanism therefor at a convenient height, the illustrative machine includes a box-like, hollow main frame 74 (FIGS. 1, 2, 6). Thus, as indicated in FIGS. 2 and 6, a pair of inwardly extending arms 76, 76 bracketed to opposite inner sides of the frame have bolted to their lower ends a casting 78 providing a bore for guiding the heightwise movement of the post 50. Also, bushing spacers 80, 80 (FIGS. 2, 3) receive bolts 82, 82 respectively threaded into the casting and extending through a plate 84 to which the cylinder 70 is made fast by clamping bolts 86.

Figures 10, 11, 12, 13:
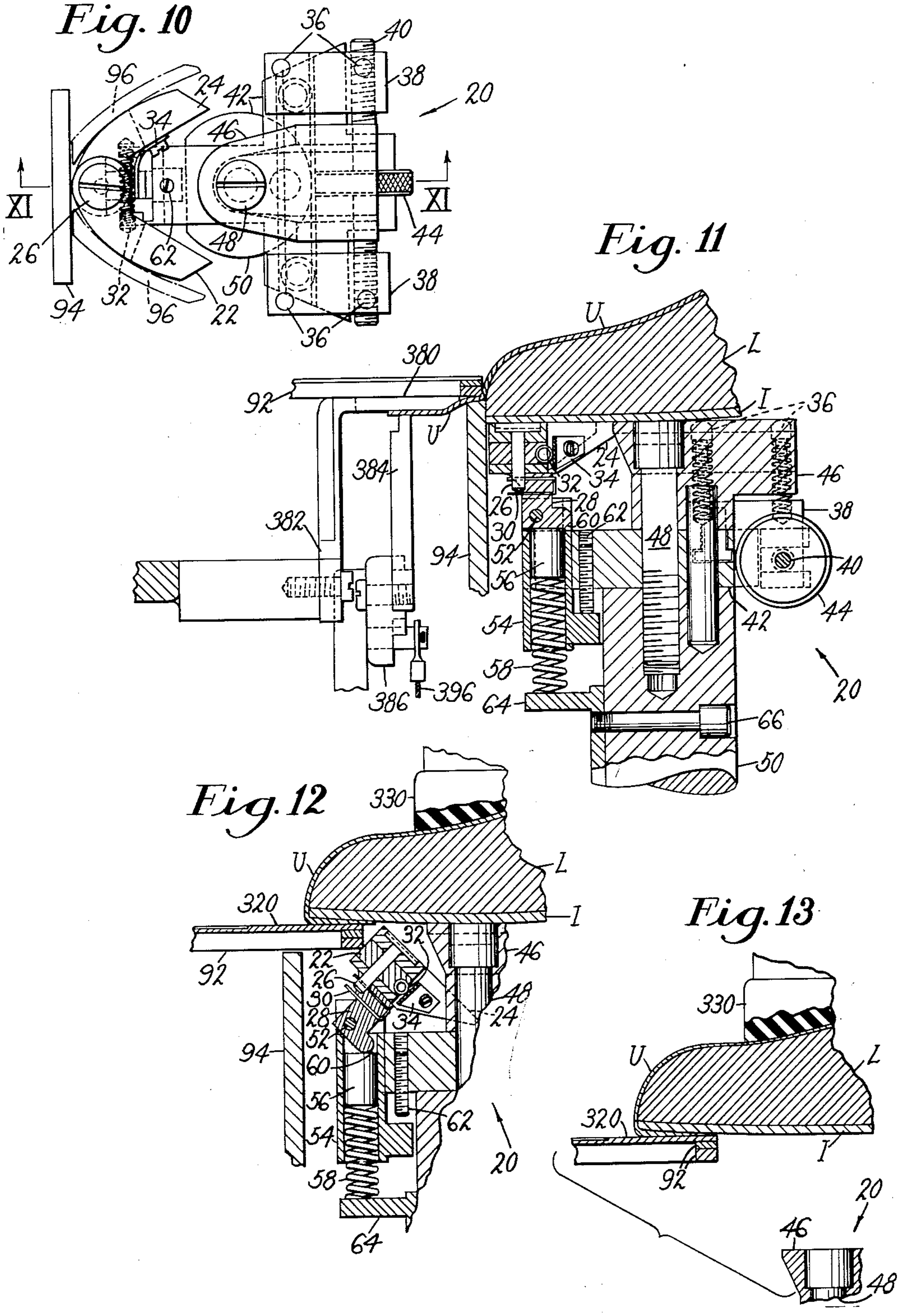
FIG. 10 is a plan view, on a larger scale, of insole engaging parts of the shoe supporting means and portions of the distributor means.
FIG. 11 is a section taken on the lines XI—XI of FIG. 10 and indicating a toe end of a shoe mounted in the machine, the toe end margin being engaged by the detecting mechanism.
FIG. 12 is a view similar to FIG. 11 but showing the shoe at a subsequent stage in the cycle, insole engaging means having been displaced by operation of an auxiliary wiper.
FIG. 13 is a view similar to FIG. 12 but taken at a still later stage in the cycle.

For cooperating with the shoe rest 20 in shaping the upper over the forepart of its last the machine is provided with novel distributor means generally designated 90 (FIGS. 4, 14) which preferably, as herein shown, consists of multiple portions about to be described, and a pair of articulate wipers 92, 92 arranged to operate above the distributor means in a plane substantially parallel to the bottom of the forepart of the last. The distributor means 90 includes an extreme toe end section 94 (FIGS. 2, 3, 7, 14) flat in shape and arranged to engage the extreme toe and face of the last and thus position it lengthwise, an arcuate distributor section 96 (sometimes termed a "dog ear") disposed at each side of the toe end section 94 and initially tangential to the supports 22, 24 (as shown in FIG. 10), and at opposite sides of the shoe in the vicinity of the tip line an especially important distributor-gripper section 98 (FIGS. 2, 4, 7, 8, 18, 22).

Figure 7:
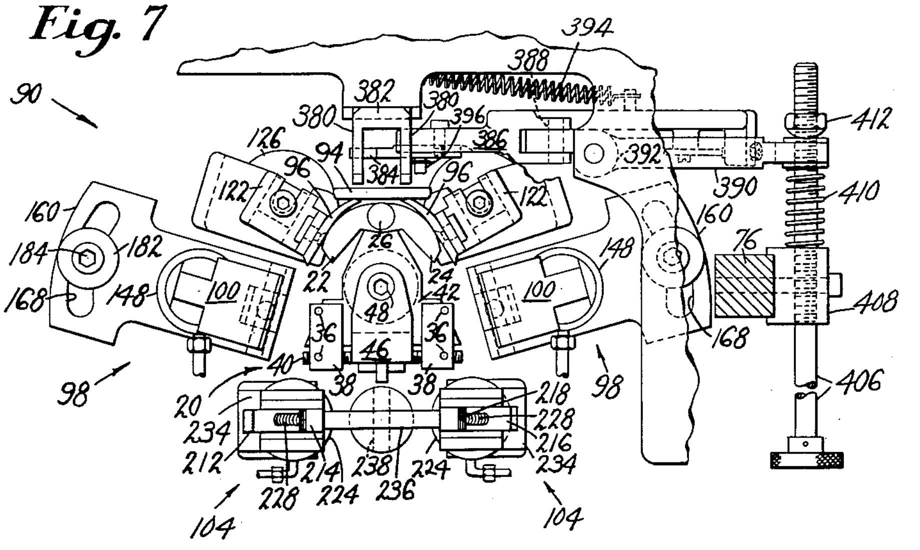
FIG. 7 is a plan view showing parts seen in FIGS. 5 and 6.
Figures 18, 19, 20, 21:
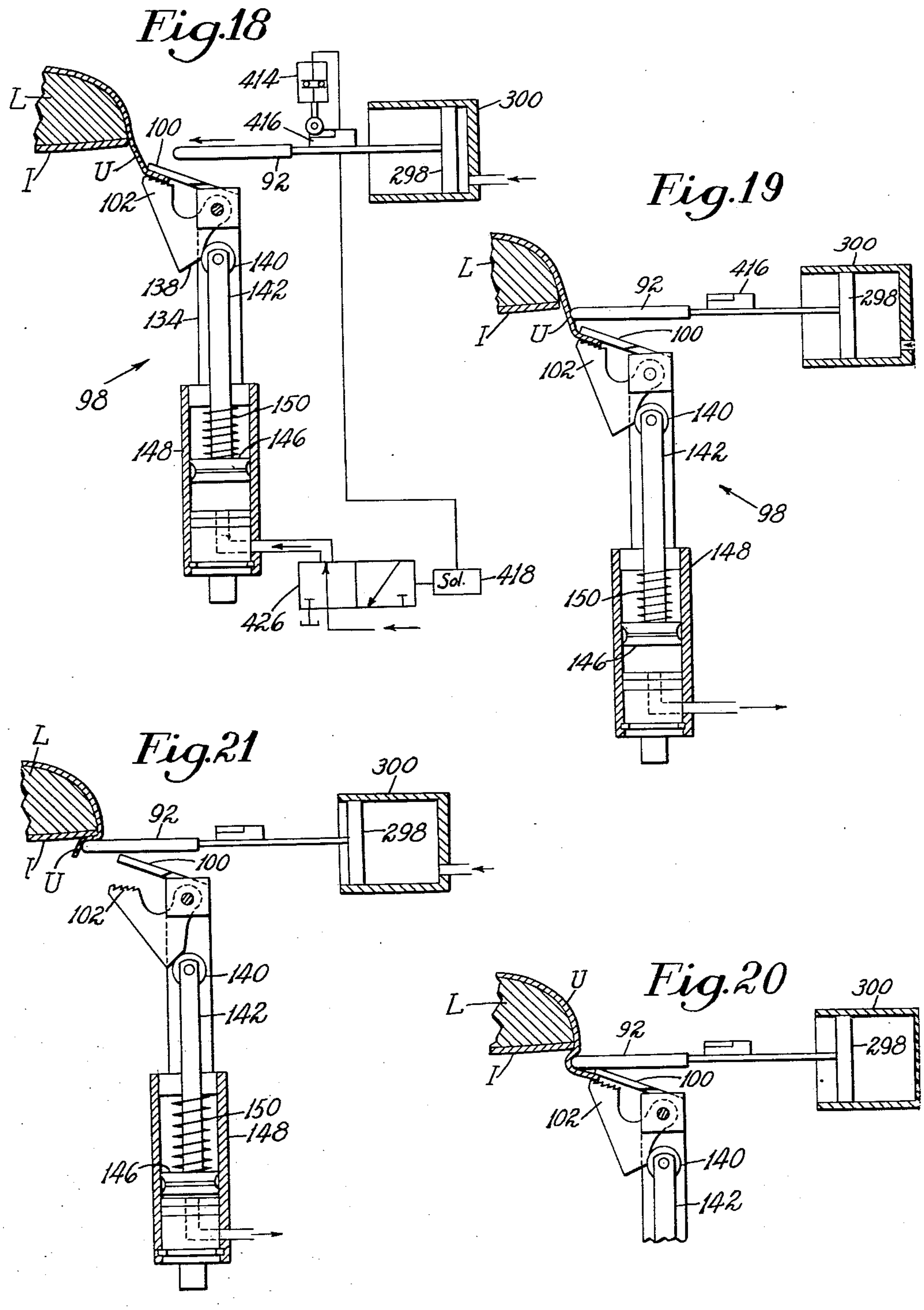

It is to be specifically understood that one or both of the last-mentioned units, although herein shown for purposes of illustration as respectively comprising a fixed smooth jaw 100 (FIG. 4) for engaging the outer surface of the upper and a serrated pivotal jaw 102 for engaging the flesh or inner side of the upper in cooperatively seizing and tensioning it (as illustrated in FIGS. 18, 19), may (despite their being termed distributor-grippers for purposes of identification) be modified in construction to resemble the dog-ear sections 96 in form and function when, and if, so desired without departing from the scope of this invention. Moreover, if so desired, a conversion of the dog-ear distributors 96 to the gripper type sections 98 will similarly be understood to involve no departure from the scope of this invention. The several sections of the distributor means 90 are disposed in general U formation, the toe end section 94 and the dog-ear distributors 96 being independently movable heightwise into and out of clamping relation with the wipers, as later explained. In order to enable the operator when presenting the shoe to the machine (see FIG. 14) simultaneously to place the margin of the upper into operating position over the toe end and dog-ear distributor sections and between the then wide open jaws 100, 102, the smooth upper engaging surfaces of the sections and the jaws initially lie proximate to the last but well below the under surfaces of the fully open wipers 92, 92. The operator accordingly may at this time, even though the heel end of the upper may not preliminarily have been temporarily attached to the heel end of the last, by practised eye and with his fingers shift the forepart of the upper on the last, if need be, to insure that the margin of the upper will be flared outwardly and in generally appropriate position for preliminary operation of the distributor portions thereon. As an adjunct to the distributor means 90 in properly working the upper over its last, there is preferably disposed rearwardly of each distributor gripper 98, in the vicinity where the sides of the shoe bottom curve inwardly, a ball gripper generally designated 104 (FIGS. 2, 3, 7).

In a cycle of operations of the machine, later to be considered, the toe end distributor 94 is guided for heightwise movement, its lower end being secured to a block 106 (FIG. 3) bored slidably to receive the post 50. The block 106 is carried by the upper end of an extensible link 108 the lower end of which is connected to one end of an operating lever 110 (FIG. 3) fulcrumed to the casting 78. The other end of the lever 110 is connected to a composite link 112 actuated heightwise by air under pressure admitted to the upper end of a cylinder 114 fast on the plate 84. For this purpose the cylinder 114 is provided with a piston 116 (FIG. 22) for displacing the rod 112 downwardly against the resistance of a return spring 121. For causing the toe end distributor 94 subsequently to clamp the outspread margin at the toe extremity against the under surface of the wipers 92 more positively, the upper end of the rod 112 is connected to a diaphragm 119 (FIG. 3) operable against the return spring 121 in a larger cylinder 120 affixed to the casting 78.

Each of the dog-ear distributors 96 is, as shown in FIG. 4, riveted or otherwise secured to an angle bracket 122 detachably secured to the upper end of a non-rotary piston rod 124 operable heightwise in response to the admission of air under pressure to the lower ends of cylinders 126, 126 respectively which are secured by bushings 128 and clamping bolts 130 extending therethrough, the lower ends of these bolts being threaded into the casting 78.

The structure, mounting, and operation of both distributor-grippers 98, 98 (FIGS. 2, 4, 7 and 22) being essentially alike, it will suffice if the construction and mounting of only one of these units is now explained. The upper jaw 100 is inclined upwardly toward the side of the shoe bottom and integral with the upper end of a member 134 (FIG. 4) pivotally carrying the lower jaw 102. The latter is provided with a cam surface 138 arranged to be engaged by a jaw-closing roll 140 mounted on the upper end of a piston rod 142 and reciprocable in a slot 144 formed in the member 134. The rod 142 is slidable in a vertical bore formed in the member and the lower end of the rod 142 is connected to an air-operated piston 146 movable upwardly in a cylinder 148 against the resistance of a return spring 150, the member 134 being secured to and constituting the upper end wall of the cylinder 148. A plug 152 (FIG. 4) constituting the bottom of the cylinder 148 is formed with an inlet 154 for admitting operating fluid, preferably air, under pressure to the piston 146 and has a depending portion 156 (FIGS. 4 and 8) bored to receive a pivot pin 158 extending widthwise of the shoe and carried by a normally horizontal lever 160. Each distributor-gripper 98 is accordingly swingable lengthwise of the shoe about the axis of the pin 158 by means to be described acting against the resistance of a return compression stabilizer spring 162 seated within a bore formed in an upstanding portion of a block 164, the bore extending upwardly through the lever 160. For urging the cylinder to assume a normally vertical position an upper end of each spring 162 bears upwardly against a flat on the bottom of the portion 156. The block is adjustably secured to the casting 78 by a clamping bolt 166 threaded therein.

In order to permit each distributor-gripper 98 to be bodily shifted initially to some extent about a vertical axis as well as lengthwise to a limited degree to accommodate shoes of different sizes and styles, the outer end of the lever 160 is formed with an arcuate slot 168 (FIGS. 7 and 8) concentric with the axis of a stud 170 vertically threaded into the casting 78 and supporting a pin 172 which pivotally carries the inner end of the lever 160. The outer end of this lever is yieldable heightwise of a vertical rod 174 (FIG. 2) extending through the slot 168 and threadedly mounted in the casting 78. Thus, the lever may swing about the axis of the pin 172 to permit inward tilting of the distributor-gripper 98, for instance in response to resistance which would be offered by the upper to tensioning stresses to be exerted thereon during the lasting operation. The lever 160 is accordingly normally engaged from below by a round-headed stop nut 176 (FIG. 2) threaded on the rod 174 and backed by a compression spring 178 acting frictionally to prevent the rod 174 from unintended turning. Acting on the lever 160 yieldingly to urge it against the nut 176 is a compression spring 180. This spring is confined between the upper surface of the lever 160 and a washer 182 backed by a cap screw 184 threaded into the upper end of a sleeve 186 threadedly receiving the rod 174. The limit of swinging of the distributor-gripper toward the shoe is adjustably determined by a stop nut 188 threaded on the rod 174 and abutting an end of the sleeve 186. By means of a knob 190 secured on the lower end of the rod 174 the initial widthwise position of the distributor-gripper may be adjusted.

Figure 8:
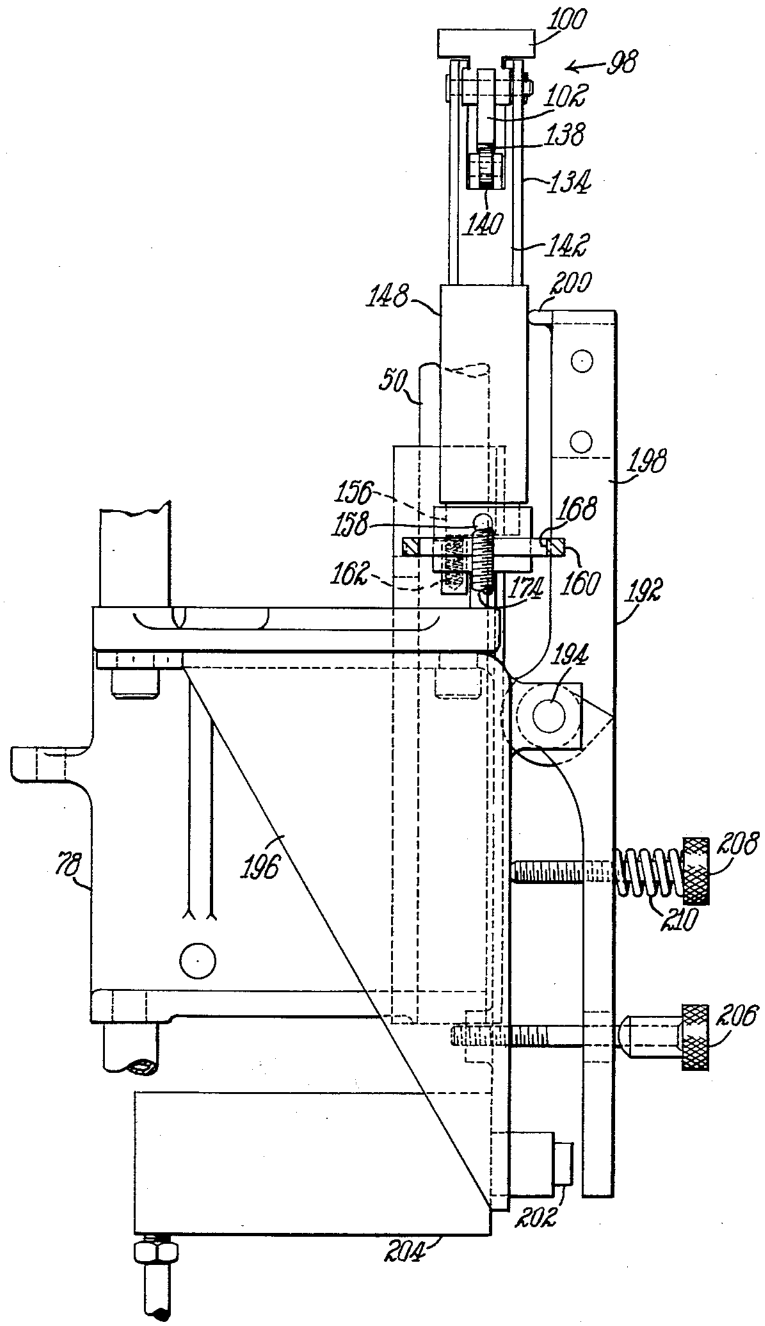
FIG. 8 is a view in side elevation of means for causing the distributor mechanism to impart a forward draft to an upper.

For simultaneously urging the distributor-grippers 98 toewardly, in an early stage of the operating cycle commonly associated with the "pulling over" function, a composite bell crank lever 192 (FIGS. 2, 4 and 8) is fulcrumed on a pair of coaxial pins 194, 194 respectively secured in brackets 196, 196 bolted to the casting 78. Spaced upper arms 198, 198 of the lever 192 respectively carry an angular piece 200 arranged, when the lever is operated by a piston rod 202 in a cylinder 204, to cause the distributor-grippers 98 simultaneously to be swung on their respective pins 158 and thus to impart a toeward draft on the upper insuring that its heel end will be drawn snugly about the heel end of the last. As best seen in FIG. 8, the limit of toeward movement is adjustably limited by a stud 206 threaded into the bracket 196 and slidably receiving the lever 192 until the latter engages a knob on the stud. The limit of clockwise movement of the lever 192 is adjustably determined by a stud 208 threaded through the lever for engagement with the bracket, the stud 208 preferably carrying a dampening spring 210.

The ball grippers 104, 104 also being of essentially similar construction and mounting, it will suffice next to describe but one of them in detail. Each ball gripper comprises a pair of levers 212, 214 (FIG. 2), the upper end of one of which is formed as a smooth jaw 216 engageable with the outer surface of the margin of the upper, and the upper end of the other of which is formed as a serrated jaw 218 engageable with the flesh or inner side of the margin cooperatively to seize it. The levers are pivotally mounted on a common fulcrum pin 220 fixed in the forked upper portion of an adaptor 222 threadedly receiving an upper end of a jaw-closing cylinder 224 (FIGS. 2, 14 and 22) and vertically bored slidably to receive a piston rod 226 of that cylinder. For forcing the jaws together against the resistance of a compression spring 228 normally urging the jaws apart, a round-nosed actuator 230 is pivoted on the upper end of the piston rod 226 and arranged vertically to abut and spread rolls 232, 232 respectively carried in the lower ends of the levers 212, 214 upon admission of air under pressure into the bottom of the cylinder 224. Each ball gripper 104 is mounted for free floating movement within limits as will now be explained. An upright, U-shaped supporting strap 234 (FIGS. 2 and 3) has its inwardly flanged upper end clamped to the top of the cylinder 224 by the adaptor 222. Substantially at their mid heights the straps 234, 234 are respectively pivotally supported on the opposite ends of an equalizing lever 236 (FIG. 2) centrally fulcrumed at 238 on a vertical rod 240. Each ball gripper is freely rotatable about its vertical axis as influenced by the upper material being conformed to its last. A tension spring 242 connecting horizontally opposed portions of the straps urges the ball grippers 104 to be swung away from the shoe to the extent yieldingly permitted by a pair of spring-backed plungers 244, 244 adjustably threaded on the opposite ends, respectively, of a stud 246 extending horizontally through a bore formed in the rod 240. The latter is guided for heightwise movement in a vertical bore of a cylindrical casting 248 (FIGS. 2 and 3) which is also formed with a horizontal bore for receiving a cylindrical projection 250 of the casting 78 extending lengthwise of the shoe. This projection carries a key 252 preventing relative rotation of the casting 248 and accordingly serves as a lengthwise guide for the ball grippers 104. In order that the latter may be locked in selected lengthwise position, the casting 78 is formed with a longitudinally extending slot 254 (FIG. 3) adapted to receive a clamping screw 256 extending through the slot 254 and threaded into the projection 250. In order that the ball grippers 104 may yield upwardly during their tensioning of the shoe upper in the course of the stresses exerted toewardly by the distributor-grippers 98, 98, an upper end of a compression spring 262 on the rod 240 abuts a shoulder formed in the vertical bore of the casting 248, the resistance to compression afforded by the spring 262 being adjustably determined by a nut 264 (FIGS. 2 and 3) threaded onto the rod 240 and abutting the lower end of the spring 262. Turning of the rod 240 about its axis is prevented by a setscrew 266 threaded into the cylindrical casting 248 and extending into a longitudinal slot 268 formed on the rod. For purposes of initially adjusting the ball grippers 104 heightwise to positions wherein the margin of the upper may be seized, a stud 270 is threaded into the cylindrical casting 248 and extends through a slot 272 extending heightwise in the projection 250 for engagement with the rod 240.

Figure 5:
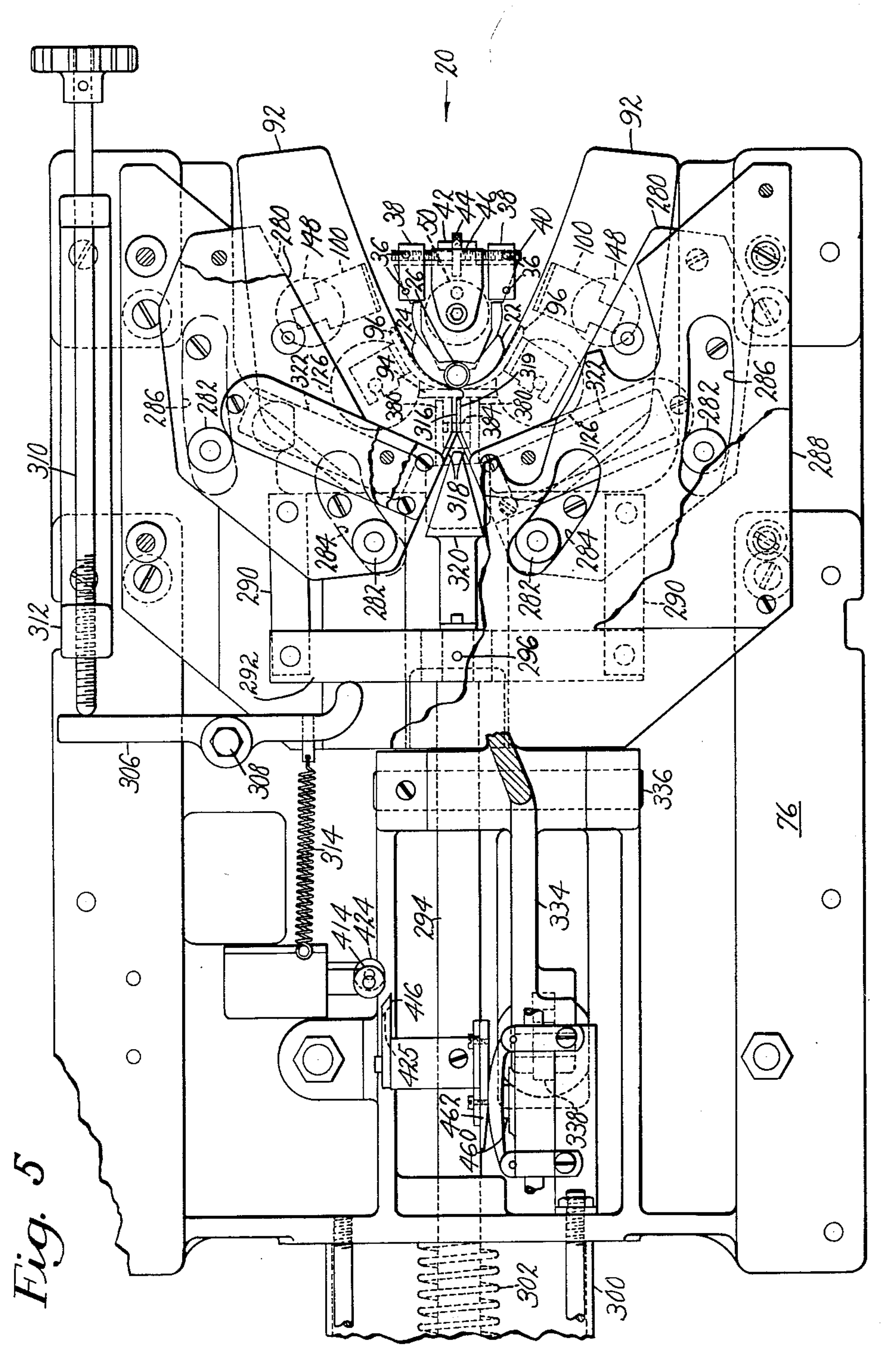
FIG. 5 is a plan view of an upper portion of the machine with its cover plate removed and showing shoe supporting means and wiper operating means.
Figure 14:
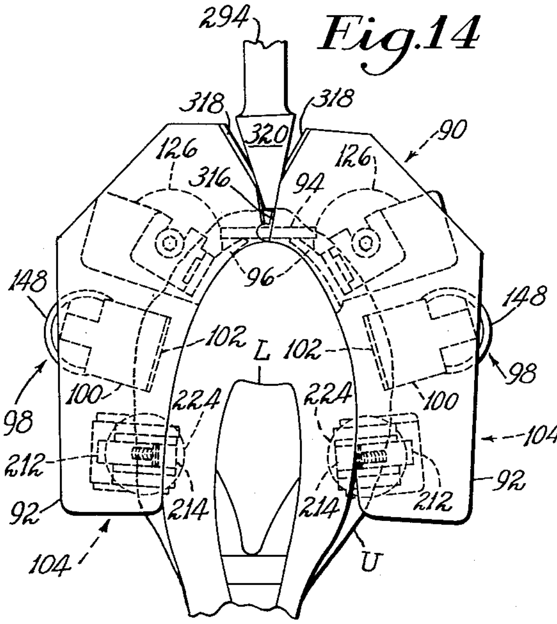
FIG. 14 is a plan view of the auxiliary wiper and main wipers in their starting positions with relation to the distributor means and a shoe to be pulled over and lasted.
Figure 15:
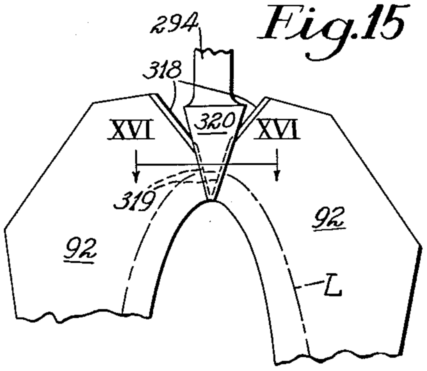
FIG. 15 is a plan view similar to FIG. 14 showing the wipers at completion of their inward movement relative to the bottom of a shoe thereon.
Figure 16:
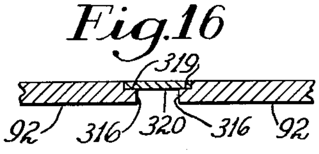
FIG. 16 is an enlarged section take substantially on the line XVI—XVI of FIG. 15.

The wipers 92, 92 (selected for operation on a particular range of sizes and styles) are respectively detachably mounted for opening and closing movements in the general plane of the shoe bottom when the latter has been appropriately positioned heightwise by relative upward movement of the lasting post 50 to its uppermost limit, the wipers preferably moving bodily lengthwise of the shoe as well as widthwise (compare FIGS. 14 and 15). Accordingly, as herein shown, each wiper 92 is supported by its carrier 280 (FIGS. 3, 5 and 6) which is provided with a pair of rolls 282, 282 for cooperating with the walls of cam slots 284, 286 respectively formed in a bed plate 288 secured to the frame 74. For operating the wipers, each carrier 280 is connected by a link 290 (FIG. 5) to an end of an equalizing lever 292 pivotally secured to a piston rod 294 (FIGS. 3 and 5) by means of a pin 296. Arranged on the rear end of the rod 294 is a piston 298 operative in a cylinder 300 affixed to the frame. Wiper advancing and closing movement is thus effected upon the admission of air under pressure into the rearward end of the cylinder against the resistance of a return spring 302 on the rod 294, a sleeve 304 also on this rod being disposed for movement with the piston to limit its operating stroke by engagement with the front end wall of the cylinder 300. As shown in FIGS. 3, 5 and 14, the focal point of the wipers 92, 92 when fully open preferably lies just above and centrally of the toe end distributor 94, a semicircular portion near the inner edge of one wiper providing a pivot bearing in a correspondingly shaped portion formed in the other wiper as the piston rod 294 is urged toward the shoe. For adjusting the focal point lengthwise a lever 306 (FIGS. 5 and 6) pivoted to the frame at 308 has one end arranged to abut the lever 292 and its other end engageable with a rod 310 (FIGS. 1, 5 and 6) adjustably threaded through an ear 312 of the frame. A tension spring 314 serves to maintain the lever 306 and the rod 310 in engagement. The inner edges of the open forepart wipers 92, 92 are preferably adapted substantially to correspond in curvature to the feather edge of the last, the wipers then also having abutting (or confronting) faces 316, 316 (FIGS. 5 and 14) extending rearwardly from the focal point, and divergent faces 318. Sustained heightwise by shoulders 319 (FIGS. 15 and 16) rabbetted in the faces 316, 318, and formed as a flat, triangular end of the rod 294, is an auxiliary wiper 320 (FIGS. 5 and 12–16, inclusive) for acting upon the margin at the extreme toe end of the shoe as hereinafter described. The margin-engaging surfaces of the main wipers 92 and of the auxiliary wiper 320 are coplanar. Preferably an electric wiper heating unit 322 (FIGS. 5 and 23) is mounted in each of the carriers 280.

Figure 9:
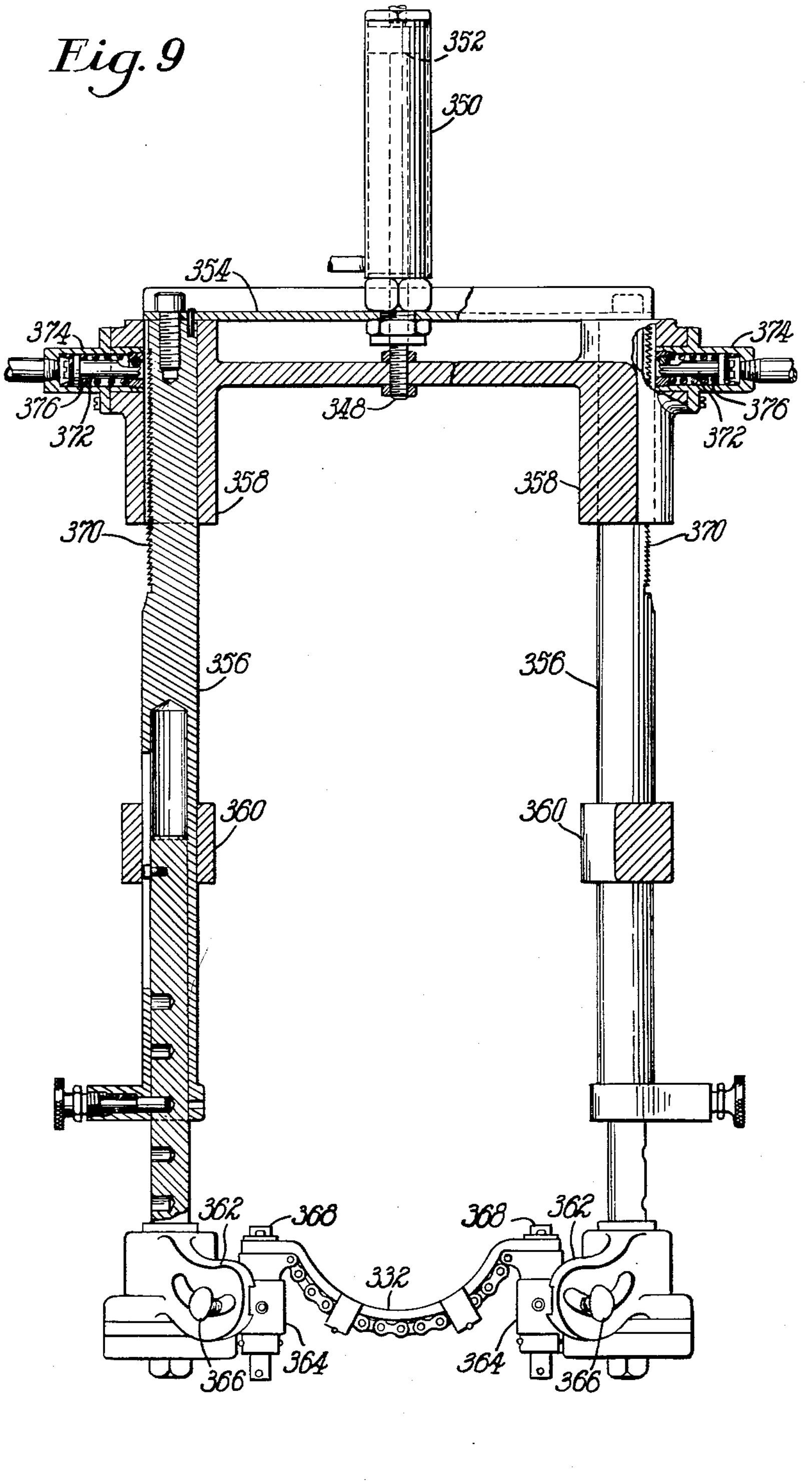
FIG. 9 is a detail plan view, partly in section, showing means for operating a shoe engaging heel band.

In order to maintain the last in its operating position while stressing the upper thereover a toe pad or holddown 330 (FIGS. 1, 3 and 13) and a heel embracing flexible band 332 (FIGS. 3 and 9) are provided. The holddown is adjustably carried on the front end of a lever 334 (FIGS. 1 and 5) pivoted to the frame on a pin 336 and connected at its rearward end by a link 338 to a piston rod 340. This rod is secured to a piston 342 operable in a cylinder 344 (FIGS. 3 and 22) against the resistance of a return spring 346 upon admission of air under pressure to the cylinder to move the holddown down onto the shoe. This cylinder is secured to the frame. For urging the band 332 at the proper time lengthwise toward or from yielding, self-conforming engagement with the heel end of the shoe, a piston rod 348 is fast on a depending arm of the frame, and a cylinder 350 (FIGS. 3, 9 and 22) is mounted for axial movement relatively to the rod 348 and reversible lengthwise of the shoe upon the admission of air under pressure to one or the other side of a double acting piston 352 on one end of the rod 348 according to control means later mentioned. Thus, the cylinder 350 is secured to a crossbar 354 which is connected at its ends respectively to a pair of parallel slide rods 356 (FIGS. 2, 3 and 9) having bearings in spaced lugs 358, 360 integral with the frame 74. Each of the rods 356 is preferably of composite, telescoping structure to facilitate adjustment lengthwise for different sizes of shoes. The front end of each slide rod is provided with an upstanding arm 362 (FIGS. 1 and 9) that is vertically slotted and affords mortise and tenon support for a holder 364 adjustably secured heightwise of the arm by a clamping screw 366 extending through the slot and into the holder. Pins 368 respectively rotatable axially in horizontal bores formed in the holders 364 serve to anchor opposite ends of the band. For positively locking the latter in shoe engaging position each of the rods 356 is formed with ratchet teeth 370 arranged to be engaged by an air-operated plunger 372. The latter are slidably mounted, respectively, in the bores of adaptors 374 fitted in the lugs 358, 360, and a compression spring 376 in each adaptor normally holds the plunger disengaged.

Means now to be described is provided for insuring that a variable predetermined margin of the upper, for instance at the extreme toe end of each shoe, will be available to be wiped inwardly over the shoe bottom. It will be understood, of course, that although this feature is herein illustrated as applied to the toe end, it may, if desired, be adapted for operation on other marginal portions the width, or position of an edge of which, it is desired to control. From the foregoing description it will be recalled that after the upper has been given a forward draft on its last, the toe end distributor 94 is caused, by admission of air under pressure to the cylinder 114, lightly to clamp the outspread margin of the upper against the flat under surface of the fully open main wipers 92, as indicated in FIG. 11, and thereafter the lasting post 50 is elevated relatively to the wipers 92 and the distributor means 90. As a consequence the lightly clamped outspread margin of the upper at the toe end is yieldingly caused to be gradually withdrawn over the flat upper end of the toe distributor 94, beneath the wipers 92 and forwardly extending spaced projections 380, 380 (FIGS. 6 and 7) of an L-shaped piece 382 secured to the frame, and over a detector finger 384 (FIGS. 5–7) disposed to engage the upper between the projections 380. For this purpose the initial upward movement of the lasting post 50 had also operated to permit the raising of the detector finger 384 from a lower out-of-the-way position within the piece 382 for engagement with the under side of the marginal stock. The finger 384 is secured to the upper arm of a lever 386 (FIGS. 6 and 7) pivotally mounted on a pin 388 horizontally carried in an end of a lever 390 which is itself pivotally supported for adjustment about the vertical axis of a stud 392 threaded into the frame. A tension spring 394 connecting the frame and the lower portion of the lever 386 acocrdingly normally urges the finger heightwise to the extent permitted by the margin or limited by a wire 396 connecting the upper arm of the lever 386 and a screw 398 adjustably threaded into the block 106. As will be apparent from FIG. 6, the arrangement is such that at the instant that the marginal edge of the upper has been withdrawn lengthwise of the shoe to the extent that the finger 384 is permitted further to rise under the influence of the spring 394, a trigger 400 secured to the lower end of the lever 386 and positioned for timing purposes by a setscrew 402 therein will actuate a switch 404 (FIGS. 6 and 23) on the casting 78. This switch is effective, as later explained, to cause the toe end margin to be clamped with considerably more force by the toe end distributor 94 against further withdrawal from beneath the open wipers prior to their advancing and closing movements. Conveniently to enable the operator to adjust the finger 384 lengthwise for different ranges of sizes and styles and for selected widths of the marginal stock to be overlaid by the main and auxiliary wipers, a rod 406 (FIGS. 1, 6 and 7) extends threadedly through a bore in a block 408 that is fixedly secured to one of the arms 76 and is slidable in a forked end of the lever 390. A compression spring 410 (FIG. 7) on the adjusting rod 406 has one end abutting the block 408 and its other end bears on the lever 390 yieldingly to hold it against a lock nut 412 threaded on the rod 406.

While the lasting margin is quite unyieldingly clamped at its extreme toe end and the dog-ear distributors 96 will have de-wrinkled marginal portions partly withdrawn therefrom but still held under heightwise tension, the upper is being tensioned heightwise by the distributor-grippers 98 which, as above noted, are free yieldingly to be swung inwardly due to stress exerted on the margin by the inwardly moving wipers 92, 92. In order to enable control over the two-way (i.e., heightwise and transversely) stressed margin to be transferred from the distributor grippers 98 to the main wipers 92, 92 commencing substantially as the latter move across the respectively adjacent outer edges of the shoe bottom (see FIGS. 18–21), means comprising a switch 414 (FIGS. 5, 18 and 23) mounted on the frame and an actuator 416 therefor adjustably affixed to the wiper operating rod 294 is provided. As later described, the main wipers 92 are thus arrested momentarily against the feather edge of the last as the operating pressure in the cylinders 148, 148 is caused to be diminished gradually (in contrast with hydraulic gripper release, see FIG. 17) in response to actuation of the switch 414 to allow the distributor-grippers to relax their hold on the upper.

Better to understand the several features of this invention, a cycle of operations of the machine will now be reviewed in conjunction with a description of the control means operable at the front of the machine and provided for the above instrumentalities, particular reference being had to a pneumatic diagram of FIG. 22 and to the schematic electrical diagram of FIG. 23. Assuming an appropriate pair of main wipers 92, 92 has been mounted in the machine and any other preliminary adjustments made, as dictated by the particular type of shoes the foreparts of which are to be pulled over and lasted, the operator will present a last bottom-down with its toe end face against the toe end distributor 94, as shown in FIG. 14, taking care that the margin of the forepart of the upper assembled on the last extends above it and the dog-ear distributors 96, and between the jaws 100, 102 and 216, 218 of the distributor-grippers 98 and the ball grippers 104, respectively. The cycle of the machine may be performed partly manually, as later explained, or wholly automatically as will now be described. A main line switch LS (FIG. 23) is closed to energize the control circuits and cause a pilot light 1PL to glow. A switch WH will also usually be closed to provide heat in the wiper heating units 322, 322 at a temperature determined by a conventional manually set control, the heated condition of the wipers being indicated by a pilot light 2PL and normally assisting in de-wrinkling and compacting the wiped margin. To initiate the cycle a foot switch FS (FIGS. 1 and 23) is closed and air is thereupon supplied under pressure from a suitable source to cylinders 148, 224 for operating the distributor-grippers 98 and ball grippers 104. For this purpose the closure of the switch FS energized solenoids 418 (FIGS. 22 and 23) and 420 through the closed switch 414 (FIGS. 5 and 23) and a switch 424 respectively. The latter is arranged later to be opened by a cam 425 (FIG. 5) secured to the wiper operating rod 294. Accordingly, a valve (not shown) in a housing 426 (FIG. 22) is shifted by the solenoid 418 from an exhaust position to permit air under pressure to be admitted to the jaw closing cylinders 148, 148 of both distributor-grippers 98. Similarly, and simultaneously, a valve in a housing 428 (FIG. 22) is shifted by the solenoid 420 from its exhaust position to cause the ball gripper jaws 216, 218 also to close on the margin of the upper on opposite sides of the shoe. By means of a restrictor valve 430 (FIG. 22), after the margin has been seized as just described, air is admitted to the cylinder 204 with a pressure effective to swing the lever 192 and thus exert through the distributor-grippers 98 a forward draft on the upper, the ball grippers 104 partaking of the forward movement of the upper relatively to its last while exerting a downward tension on the upper in the vicinity of the ball.

Subsequent to the forward motion of the distributor-grippers, air pressure in the cylinder 204 builds up to actuate a pressure switch 432 (FIGS. 22 and 23) effective to energize a solenoid 434 (FIGS. 22 and 23) and thus shift a valve in a housing 436 from its inoperative position shown to one in which air under pressure is directed to the toe end distributor operating cylinder 114, to the dog-ear distributor operating cylinders 126, and to the lasting post operating cylinder 70. Hence, the upper ends of the distributors 94, 96 move upwardly releasably to clamp the outspread margin against the surface of the main wipers 92 which are then stationary and fully open. As the lasting post 50 moves upwardly between the wipers 92 and relatively to the grippers 98 and 104, it continues to elevate the last. The entire forepart of the upper is accordingly being tensioned heightwise for conformance therewith, and marginal stock, which is thus initially being permitted yieldingly to be withdrawn over the toe and dog-ear distributors, is de-wrinkled substantially all along a line parallel to the edge of the shoe bottom and extending from the ball area on one side of the shoe, around the toe end, to the ball area on the other side.

The upward movement of the lasting post 50 causes the wire 396 (FIG. 6) to be slackened and the spring 394 is thus allowed to lift the detector finger 384 into engagement with the outspread margin at the toe end as above explained and shown in FIG. 11. At the instant that the edge of the margin, at the toe end of the upper, is drawn from over the finger, the spring 394 is effective further to swing the lever 386 clockwise as seen in FIG. 6 and the trigger 400 trips the switch 404 to energize a solenoid 438. As a consequence a valve within the housing 440 (FIG. 22) is shifted from its exhaust position to admit air under relatively higher pressure, via a needle valve 442, to the cylinder 120 (FIGS. 3 and 22) thereby causing the toe distributor 94 promptly and more positively to clamp the upper with a predetermined margin at the toe end against the wipers to prevent further relative withdrawal of the upper at the toe extremity.

Near the end of the upward movement of the post 50, the forepart of the last bottom having been moved upwardly between the wipers 92, 92 and arrived substantially in the plane of the wipers 92 (indicated in FIG. 12), provision is made for operation of means for more firmly locking the shoe against movement due to lasting stresses and for then initiating wiping action after upward movement of the shoe rest 20 ceases. To this end a plate 444 (FIGS. 2 and 3) is loosely supported at one end by the head of a screw 446 threaded into the casting 78. The other end of the plate 444 adjustably carries a button 448 arranged to engage a switch 450. A nut 452 adjustably threaded on the post 50 to determine the extent of heightwise tensioning of an upper is disposed to engage the plate and thus cause the button to actuate the switch 450 and hence energize a solenoid 454 (FIGS. 22 and 23). A valve within a housing 456 (FIG. 22) is consequently shifted from an inoperative position to admit air under pressure, which is initially rather light as determined by a valve 457, to the toe pad operating cylinder 344 thus causing the toe pad 330 to bear downwardly on the shoe to clamp it on the shoe rest 20. Thereupon, too, air under pressure (which had been maintaining the band inoperative) is redirected effectively to be admitted to the other side of the piston 352 to move the cylinder 350 and hence cause the heel band 332 to engage the heel end of the clamped shoe preparatory to operation of the wipers 92. The latter are then advanced heelwardly, being yieldingly impelled by air pressure as controlled by a sequence valve 458 (FIG. 22), and begin to close. As indicated in FIG. 22, the locking plungers 372 are caused to engage the teeth 370 by air pressure bled from that built up after the band 332 has engaged the shoe and thus hold the heel band against yielding from its shoe engaging position during operation of the wipers.

The above mentioned closure of the switch 450 is also effective to energize an interlocking relay coil 10CR closing relay contact 10CR, and to energize a relay coil 11CR (FIG. 23) which closes three holding circuits respectively including relay contacts 11CR. A selector switch 2SS–B (FIG. 23) then being closed for automatic operation (while a selector switch 2SS–A is open), and the switches 424 and 432 being closed, a cycle timer coil 5TR is energized to close or "start" a timer contact 5TR in a circuit including one of the now closed 11CR contacts. It is to be noted that release of the depressed foot switch FS (FIGS. 1 and 23) at any time prior to closure of the switch 450 enables the operator, should he so desire, to permit the return of the operating instrumentalities to their starting positions and thus affords him an opportunity to reposition the upper on its last or make other correction.

Figure 17:
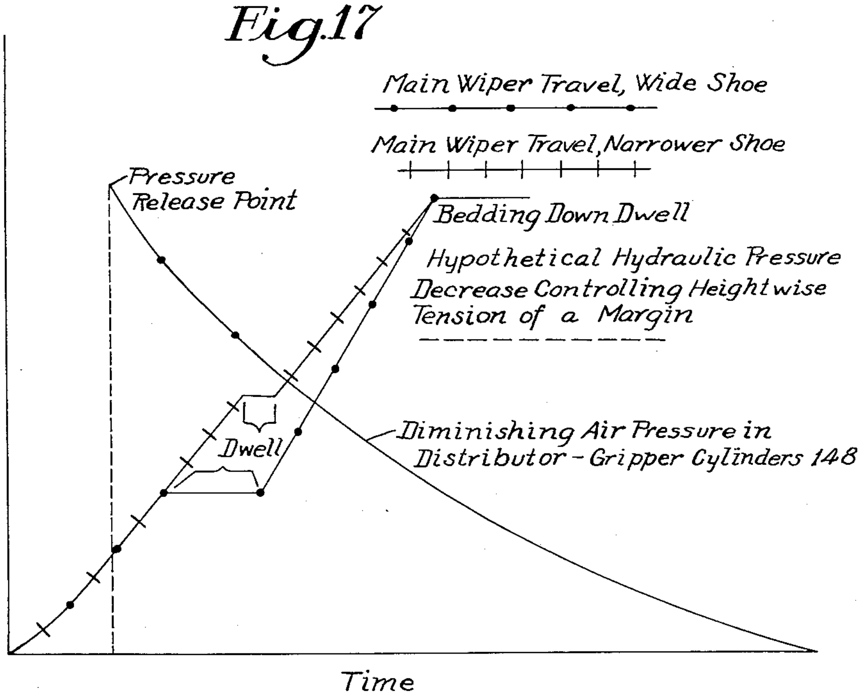
FIG. 17 is a diagrammatic chart illustrating wiper movements as effected by different widths of shoes, and contrasting pneumatic and hydraulic pressure decrease when these fluid pressures have controlled heightwise tensioning of an upper being wiped.

In an early portion of the inward movement of the main wipers 92, 92 the switch 414 (FIGS. 5 and 23) is engaged and opened by the actuator 416 to deenergize the solenoids 418 and 438. Deenergizing the solenoid 438 relieves the margin, which had been positively clamped by the distributor 94 at the toe end, from excessive stress as the wipers advance and are to commence closure. Pressure in the cylinder 114 still causes the distributor 94 releasably to clamp the margin. On engaging the yieldingly tensioned margin at opposite sides of the shoe, each wiper 92 is being urged inwardly by air under a pressure which is building up in the wiper operating cylinder 300 as resistance to inward wiping is afforded by the inherently yieldable counter-balancing pressure within the distributor-gripper operating cylinders 148. The operating arrangement preferably is such that the opening of the switch 414 and consequent deenergizing of the solenoid 418 is timed to permit the distributor-gripper operating pressure in the cylinders 148 gradually to be diminished commencing just as the wipers 92 reach the outer edges of the insole I (as indicated in FIG. 19). The inherent yieldability of air under pressure (as contrasted for instance with hydraulic pressure) which had been operative in the distributor-gripper cylinders 148 to counter that in the wiper operating cylinder 300 is especially advantageous in automatically locating the gripper pressure release point as just stated and without the operator being concerned as to the width of the shoe being lasted. As the grip of the jaws 100, 102 is being gradually relaxed, the wiper 92 at each side of the shoe bottom is arrested after it has crossed the edge of the shoe bottom and wiped the tensioned margin inwardly over the edge of the insole, as shown in FIG. 20. The springs 36 and insole supports 22, 24, which have been bracing marginal portions of the insole against buckling, yield inwardly on being displaced by forces exerted through the margin of the upper by the wipers. After a momentary dwell (which, as shown in FIG. 17, is found to correspond substantially in proportion to the width of the shoe being operated upon), inward wiping movement is resumed, the distributor-grippers 98 completely surrendering control of the upper to the wipers 92 and retracting to their initial positions. Completion of the inward wiping movement of the wipers 92 to positions shown in FIG. 15 causes the cam 425 to open the switch 424 thereby deenergizing the solenoids 434, 420 and the timer coil 5TR. These deenergized solenoids thereupon permit return of the toe end distributor 94, the dog-ear distributors 96, the lasting post 50, and the ball grippers 104 to their initial inoperative positions. Preferably, to enable the toe rest 20 quickly to return to its out-of-the-way position after the wipers 92 have moved approximately two-thirds of the way inwardly from the insole edge, a dumping valve 460 (FIGS. 5 and 22) has been actuated by a cam 462 on the wiper operating rod 294. The deenergized valve 434 now is effective through a sequence valve 463 to shift a 2-way valve in a housing 464 (FIG. 22) to open it for admission of air under higher pressure via a valve 465 to the cylinder 344, and the toe pad 330 supplies bedding down pressure against the closed wipers (as indicated in FIG. 13) which now uninterruptedly engage the precemented margin as shown in FIG. 15. The timer contact 5TR opens after a predetermined interval in which the wipers have dwelled with bedding pressure on the overwiped margin against the shoe bottom, and as a consequence the holding circuits are deenergized and the entire electrical and pneumatic system reset. Upon return of the toe pad 330, and retraction of the heel band 332 and the wipers, the shoe may be removed from the machine or allowed to fall in a convenient receptacle mounted on the front of the machine.

It should be noted that, as the wipers 92, 92 advance and close, their confronting faces 316 diverge and hence, were there no auxiliary wiper 320, an extreme toe end portion of the margin would receive only the benefit of momentary overwiping action.

The auxiliary wiper 320, however, advances on and is supported heightwise by the shoulders 319 as the main wipers 92 close. Hence, in assuming their positions shown in FIG. 15, there is no portion of the inwiped margin which escapes bedding down pressure, and the particularly critical toe end has been beneficially wiped smooth by the auxiliary wiper.

Referring to FIG. 17, and by way of emphasizing distinction in the illustrated air-powered machine over a like machine which might be hydraulically powered, it is first to be observed that, in the absence of costly valving or regulating mechanism, hydraulic pressure controlling heightwise tensioning of an upper (for instance through a gripper) cannot be gradually diminished. It drops to zero in substantially no time after initial release, as indicated by the graph, whereas air pressure may be diminished at the desired rate and comparatively gradually in the distributor-gripper cylinders 148 or in the distributor operating cylinders. This is important since it affords design latitude, for instance non-critical relative movement of the wipers and upper tensioning means. Specifically, it enables the wiper of the illustrative machine to function automatically and properly on any last within a considerable range of widths, in each case the wiper 92 crossing the insole edge substantially as pressure controlling the distributor-grippers 98 is diminished to allow the wiper to dwell against the insole. The wiper on the wide shoe commences its dwell earlier and it takes somewhat longer for distributor-gripper pressure to decrease to the point where inward wiper travel may be resumed. In each case the upper is maintained under continuous tension as its margin is worked over the feather edge and inwardly of the last bottom.

For operating the machine, if desired, on a semi-automatic basis, the selector switch 1SS would be shifted to the manual contact in FIG. 23, the switch 2SS–A would similarly be shifted, and the switch 2SS–A would be opened. Now, if the operator is satisfied with the position of the upper on its last, a switch 1PB (FIG. 23) is closed to initiate wiper closing movements, and the switch 2PB (FIG. 23) is opened when the shoe is to be released and the machine cycle reset, the various instrumentalities otherwise performing in the same manner and in the sequence previously described.

From the foregoing it will be appreciated that the invention provides a versatile, compact, and easily operated machine capable of high production in pulling over and lasting the foreparts of shoes.

Having thus described our invention, what we claim as new and desire to secure by Letters Patent of the United States is:

1. In a machine for shaping uppers over lasts and including a gripper for initially tensioning heightwise an upper of a shoe to be lasted, a wiper, air operated devices for yieldingly operating the gripper and the wiper, respectively, jointly to stress a margin of the upper and wrap it snugly about the last adjacent to the shoe bottom, and means acting automatically in the course of a build-up of wiper operating pressure gradually to relieve the pressure operating the gripper whereby the latter exerts diminishing tension and then completely surrenders control of the margin only as the wiper moves inwardly over the edge of the shoe bottom to complete the overlaying action.

2. In a machine for shaping uppers over lasts, a gripper for tensioning heightwise the upper of a shoe to be lasted, a wiper for wiping the margin of the tensioned upper inwardly over the shoe bottom, a pair of fluid pressure operated piston-cylinder devices respectively arranged to operate the gripper and the wiper to control the upper, and a single control means for commencing reduction of the pressure in the gripper operating device substantially as the wiper passes the edge of the shoe bottom whereby diminishing gripper operating pressure following a dwell of the wiper against the shoe bottom permits control of the upper increasingly to be transferred from the gripper to the wiper.

3. In a machine for shaping uppers over lasts, a gripper for tensioning an upper of a shoe heightwise of its last, a wiper for thereafter moving inwardly to wipe the tensioned upper inwardly over the shoe bottom, fluid pressure operated piston-cylinder devices respectively arranged to operate the gripper and the wiper, and means operative, as pressure on the wiper operating device is increasing, for diminishing the pressure effective on said gripper operating device at a predetermined rate to insure that the tensioning stress initially exerted solely on the upper by the gripper is lessened only after an interval wherein combined stress is exerted by the gripper and the wiper and when the wiper has pressed the upper against the shoe bottom.

4. In a machine for shaping uppers over lasts, a gripper for tensioning heightwise the upper of a shoe to be lasted, a wiper for wiping the margin of the tensioned upper inwardly over the shoe bottom, one fluid pressure operated device for operating the gripper and another fluid pressure operated device for operating the wiper after the upper has been tensioned, means respectively connecting said devices to sources of fluid pressure sequentially to stress the upper first by the gripper and then jointly by the gripper and the wiper as the latter moves inwardly across the edge of the shoe bottom, and means thereupon operative to relieve the pressure to said gripper operating device whereby the wiper may complete its wiping movement and assume full control of the upper.

5. In a machine for shaping uppers over lasts, a shoe rest for supporting the forepart of a last with an upper and an insole thereon in bottom-down position, wipers arranged initially to extend around the toe end of the last and along the sides thereof, means respectively at the toe end and at opposite sides thereof for releasably clamping spaced portions of the margin of the upper against the wipers, each of said clamping means being mounted to yield inwardly of the last, and means for relatively moving the rest and the wipers to tension the margin heightwise of the shoe preparatory to inward wiping movement of the wipers over the shoe bottom.

6. In a machine for shaping uppers over lasts, a shoe rest for supporting the forepart of a last with an upper and an insole thereon in bottom-down position, wipers initially extending around the toe end of the last and along the sides thereof substantially to opposite ends of the ball line, distributor means for releasably clamping the margin of the upper against the wipers at the toe extremity and in localities spaced rearwardly thereof along a line substantially parallel to the feather edge of the last, means for relatively moving the rest and the wipers to tension heightwise and dewrinkle the margin as it is partly withdrawn from beneath the wipers, and means for operating the wipers inwardly over the shoe bottom when a predetermined width of lasting margin remains at the toe extremity to be thus wiped.

7. In a machine for wiping uppers over lasts, a shoe rest for supporting the forepart of a last with an upper and an insole thereon in bottom-down position, wipers initially extending around the toe end of the last and along the sides thereof substantially to opposite ends of the ball line, distributor means for releasably clamping the margin of the upper against the wipers at the toe extremity and in localities spaced rearwardly thereof, means for relatively moving the rest and the wipers to tension said margin heightwise, power means for yieldably urging the wipers inwardly substantially in the plane of the shoe bottom when the relative movement of the rest and the wipers has ceased, and means for relinquishing control of the margin in said localities to the wipers commencing substantially as they cross the adjacent insole edge.

8. In a machine for shaping uppers over lasts, a shoe rest for supporting the forepart of a last with an upper and an insole thereon in bottom-down position, wipers initially extending around the toe end of the last and along the sides thereof, means for releasably clamping the margin of the upper against the wipers at the toe end and at opposite sides thereof, grippers for seizing the margin rearwardly of said clamping means, means for relatively moving the rest and the wipers to tension the upper heightwise about the forepart from the ball area on one side to the ball area on the other side, fluid pressure means for yieldably moving the wipers inwardly to wipe the tensioned margin against the shoe bottom, and mechanism responsive to operation of the wipers for relaxing the hold of the grippers on the margin commencing substantially as the wipers across the edge of the insole.

9. In a machine for shaping uppers over lasts, a shoe rest for supporting the forepart of a last with an upper and an insole thereon in bottom-down position, wipers initially extending around the toe end of the last and along the sides thereof, means for releasably clamping the margin of the upper against the wipers at the toe end and at opposite sides thereof, pneumatically actuated grippers for seizing the margin rearwardly of said clamping means, means for relatively moving the rest and the wipers to tension the upper heightwise about the forepart from the ball area on one side to the ball area on the other side, pneumatic means for yieldably moving the wipers inwardly to wipe the tensioned margin against the shoe bottom, and mechanism responsive to operation of the wipers for relaxing the hold of the grippers on the margin commencing substantially as the wipers cross the edge of the insole.

10. In a machine for shaping uppers over lasts, a shoe rest for supporting the forepart of a last with an upper and an insole thereon in bottom-down position, wipers initially extending around the toe end of the last and along the sides thereof, means for releasably clamping the margin of the upper against the wipers at the toe end and at opposite sides thereof, grippers for seizing the margin rearwardly of said clamping means, means for relatively moving the rest and the wipers to tension the upper heightwise about the forepart from the ball area on one side to the ball area on the other side, pneumatic means for sequentially operating the grippers and wipers, the latter being thus moved inwardly to wipe the tensioned margin over the clamping means and against the shoe bottom, and mechanism responsive to operation of the wipers for relaxing the hold of the grippers on the margin commencing substantially as the wipers cross the edge of the insole.

11. In a machine for shaping uppers over lasts, a shoe rest for supporting the forepart of a last with an upper and an insole thereon in bottom-down position, wipers initially extending around the toe end of the last and along the sides thereof, means for releasably clamping the margin of the upper against the wipers at the toe end and at opposite sides thereof, grippers for seizing the margin rearwardly of said clamping means, means for relatively moving the rest and the wipers to tension the upper heightwise about the forepart from the ball area on one side to the ball area on the other side, pneumatic means for sequentially operating the grippers, clamping means, shoe rest and wipers, the latter being thus moved inwardly to wipe the tensioned margin against the shoe bottom, and mechanism responsive to operation of the wipers for relaxing the hold of the grippers on the margin commencing substantially as the wipers cross the edge of the insole.

12. In a machine for shaping uppers over lasts, a shoe rest for supporting the forepart of the last with an upper and an insole thereon in bottom-down position, wipers initially extending around the toe end of the last and along the sides thereof substantially to opposite ends of the ball line, distributor means for releasably clamping the margin of the upper against the wipers at the toe end and at opposite sides thereof, grippers for seizing the margin rearwardly of said clamping means and for imparting an initial forward draft to the upper at opposite sides thereof, means for relatively moving the rest and the wipers after said forward draft to tension the upper heightwise about the forepart from the ball area on one side to the ball area on the other side, fluid pressure means for yieldingly moving the wipers inwardly to wipe the tensioned margin against the shoe bottom, and mechanism responsive to operation of the wipers for relaxing the hold of the grippers on the margin commencing substantially as the wipers cross the edge of the insole.

13. In a machine for shaping uppers over lasts, a pair of articulated wipers initially open for embracing the forepart of a shoe upper assembled on a last and for thereafter closing substantially in a plane to wipe an outspread margin of the upper inwardly over an insole on the last, a shoe rest movable to carry the bottom of the shoe between the open wipers and slightly beyond their plane of operation, sectional distributor means disposed yieldingly to clamp the outspread margin of the upper against the wipers in the course of the movement of the shoe rest to tension heightwise and dewrinkle the forepart from the ball area on one side of the shoe bottom, around the toe, to the ball area on the other side of the shoe bottom, and fluid pressure means for yieldingly operating the distributor means and the wipers in sequence, said fluid pressure means including mechanism operative near the end of the movement of the shoe rest for causing a section of the distributor means more positively to clamp a portion of the margin against movement relatively to the wipers prior to effecting the inward wiping movement of the wipers.

14. In a machine for shaping uppers over lasts, a shoe rest for supporting the forepart of a last with an upper and an insole thereon in bottom-down position, wipers arranged initially to extend around the toe end of the last and along the sides thereof, means for seizing the margin of the upper at opposite sides of its forepart and for imparting a toeward draft thereto while yieldingly holding the margin outspread from the insole, means for relatively moving the rest and the wipers to tension the margin heightwise of the shoe, fluid pressure means for operating the wipers to cause them to engage the tensioned margin and close widthwise of the shoe bottom against the resistance of said margin seizing means, said rest including insole engaging elements displaceable from the operating path of the wipers, and control means for relaxing the grip of the margin seizing means commencing substantially as the wipers cross the edge of the insole and then removing the shoe rest from the shoe.

15. In a machine for shaping uppers over lasts, a shoe rest for supporting the forepart of a last with an upper and an insole thereon in bottom-down position, wipers arranged initially to extend around the toe end of the last and along the sides thereof, means for seizing the margin of the upper at opposite sides of its forepart for imparting a toeward draft thereto while yieldingly holding the margin outspread from the insole, means for relatively moving the rest and the wipers to tension the margin heightwise of the shoe, fluid pressure means for operating the wipers to cause them to engage the tensioned margin and move inwardly of the shoe bottom against the resistance of said margin seizing means, said rest including insole engaging elements yieldingly displaceable inwardly in response to the wiper movements, and control means responsive to operation of said wiper operating means for thereafter relaxing the grip of the margin seizing means and then removing the shoe rest from the shoe.

16. In a machine for shaping uppers over lasts, means for supporting a last, a pair of main wipers, means operable to advance the main wipers bodily and then close them to wipe the margin of an upper of a shoe on the last inwardly against its bottom, and a single auxiliary wiper actuated by said wiper operating means, the auxiliary wiper having a narrow, tapering end and adapted to move rectilinearly inwardly over the shoe bottom between the main wipers and lengthwise at an end of the last as they close to present a continuous, uninterrupted wiping and bedding down planar surface thereby to conform the lasting margin to the bottom of the last.

17. In a machine for shaping uppers over lasts, means for supporting a last with an insole and an upper assembled thereon, said means including marginal insole toe engaging supports yieldingly swingable about an axis extending widthwise, a pair of main wipers initially arranged to extend about the toe end and along the sides of the shoe bottom, means for moving these wipers bodily over the insole to deflect said supports and then about a focal point to wipe the margin of the upper inwardly against the shoe bottom, and an auxiliary wiper having a flat surface movable thereafter across the focal point to supplement the main wipers in acting on the margin at the toe end and complement their action in applying pressure to the overwiped margin.

18. In a machine for shaping uppers over lasts, means for supporting a last bottom down with an insole and an upper thereon, a pair of wipers extending around the toe end and along opposite sides, distributor means for clamping the margin of the upper against the wipers, means for causing relative motion between the wipers and supporting means to tension the upper heightwise, a toe pad initially cooperative with the supporting means, and means responsive to closure of the wipers inwardly of the edge of the shoe bottom for rendering the distributor means inoperative and for retracting said supporting means thereby clamping the shoe on the wipers by means of the toe pad.

19. In a machine for shaping uppers over lasts, a shoe rest for supporting a last bottom down with an insole and an upper assembled thereon, wipers extending around the toe end and along opposite sides of the shoe, distributor means for determining the lengthwise position of the last relatively to the wipers and for clamping the margin of the upper thereagainst, means for relatively moving the shoe rest and the wipers to tension the upper heightwise, a toe pad and a heel band respectively cooperative with the last to hold it in operative position, means responsive to operation of said means for relatively moving the rest and the wipers for causing the latter to wipe the margin inwardly against the shoe bottom, and means responsive to completion of the inward wiping movement of the wipers for retracting the shoe rest and for causing the toe pad to clamp the inwiped margin against the wipers with increased pressure.

20. In a machine for shaping uppers over lasts, a shoe rest for supporting the forepart of a last with an upper and an insole thereon in bottom-down position, wipers arranged initially to extend around the toe end of the last and along the sides thereof, distributor means comprising sections individually movable for releasably clamping the margin of the upper against the wipers at the toe end and at each side thereof, means for relatively moving the rest and the wipers to tension the margin heightwise as it is withdrawn with respect to the distributor sections, a detector engageable with the margin, and means controlled by the movement of the edge of the margin with respect to the detector for causing one of the distributor sections more positively to clamp the margin against withdrawal relatively to the wipers preparatory to their inward wiping movement.

21. In a machine for shaping uppers over lasts, a shoe rest for supporting the forepart of a last with an upper and an insole thereon in bottom-down position, wipers arranged initially in open position to extend around the toe end of the last and along the sides thereof, distributor means for releasably clamping the toe end of the margin of the upper against the wipers and including yieldably mounted grippers for seizing the margin substantially at opposite ends of the ball line, means for relatively moving the rest and the wipers to tension the margin heightwise, a detector engageable with the margin at a selected distance from the inner edge of the open wipers for sensing the relative position of the edge of the margin, and means responsive to operation of the detector for stopping relative movement of the rest and the wipers and for initiating inward wiping movement of the wipers, said last-mentioned means being effective at a predetermined point in the inward movement of the wipers to relax the grip of said grippers in order to transfer control of the margin completely to the wipers as they pass across the outer edges of the insole.

22. In a machine for shaping uppers over lasts, a shoe rest for supporting the forepart of a last with an upper and an insole thereon in bottom-down position, wipers arranged initially to extend around the toe end of the last and along the sides thereof, distributor means cooperating with the wipers in releasably clamping the margin of the upper around the toe end and including yieldable grippers for seizing the margin at opposite ends of the ball line, means for relatively moving the rest and the wipers until at least a predetermined width of lasting margin remains in engagement with the wipers, means responsive to operation of the last-mentioned means for initiating inward wiping movement of the wipers, and means responsive to said inward wiping movement for relaxing the hold of said grippers commencing substantially when the wipers cross the edge of the insole in the vicinity of the ball line.

23. In a machine for shaping uppers over lasts, a pair of forepart embracing wipers operable substantially in a plane, means for carrying heightwise of the wipers a last with an insole and an upper assembled thereon, means comprising a plurality of sections for releasably clamping the margin of the upper against the wipers to tension the upper heightwise of the last as said last carrying means moves the shoe bottom relatively to said plane, a detector adjacent to said clamping means and predeterminedly spaced from the edge of the insole for yieldingly engaging the margin, and mechanism responsive to withdrawal of the edge of the margin over the detector during the movement of said last carrying means for causing one section of the clamping means more positively to hold the margin against withdrawal prior to operation of the wipers inwardly over the shoe bottom.

24. In a machine for shaping uppers over lasts, a pair of forepart embracing wipers operable substantially in a plane, means for carrying heightwise of the wipers a last with an insole and an upper assembled thereon, means including a plurality of distributors arranged in general U-shape for releasably clamping the margin of the upper against the wipers to tension the upper heightwise of the last as said last carrying means moves the shoe bottom beyond said plane, a detector adjacent to one of said distributors and predeterminedly spaced from the edge of the insole for yieldingly engaging the margin, mechanism responsive to withdrawal of the edge of the margin over the detector during the movement of said last carrying means for causing said one distributor more positively to hold the margin against withdrawal prior to operation of the wipers inwardly over the shoe bottom, and means for thereafter ceasing the movement of the last carrying means and initiating operation of the wipers.

25. In a machine for shaping uppers over lasts, a shoe rest for supporting the foreparts of lasts of different widths with an insole and an upper assembled thereon in bottom-down position, wipers initially arranged to extend around the toe end and along the opposite sides thereof, means for releasably seizing the margin of the upper including air operated grippers yieldably and pivotally mounted at opposite ends of the ball line, mechanism for relatively moving the rest and the seizing means to tension the margin heightwise of the shoe, air operated means for urging the wipers to wipe the tensioned margin inwardly of the shoe bottom, and valve means responsive to operation of said wiper operating means for automatically relaxing the hold of the grippers on the upper commencing substantially as the wipers cross the edge of the insole at the ends of the ball line.

26. In a machine for shaping uppers over lasts, a shoe rest for supporting the foreparts of lasts of different widths with an insole and an upper assembled thereon in bottom-down position, wipers initially arranged to extend around the toe end and along the opposite sides thereof, means for releasably seizing the margin of the upper including air operated grippers yieldably and pivotally mounted at opposite ends of the ball line, mechanism for relatively moving the rest and the seizing means to tension the margin heightwise of the shoe, air operated means for urging the wipers to wipe the tensioned margin inwardly of the shoe bottom, and valve means responsive to operation of said wiper operating means for automatically relaxing the hold of the grippers on the upper each time in the operation of the machine when the wipers cross the edge of an insole at the ends of the ball line in operating upon shoes of different widths.

27. In a machine for shaping uppers over lasts, a shoe rest for supporting a last with an insole and an upper thereon in bottom-down position, wipers initially extending around the toe end and along the sides, clamping means arranged releasably to clamp the outspread margin of the upper around its toe end against the wipers, grippers disposed rearwardly of said clamping means for seizing the margin of the forepart of the upper at opposite sides of the shoe bottom initially to tension the upper lengthwise of the last while the outspread margin at the toe end remains free and unclamped, and mechanism for thereafter relatively moving the rest and the wipers to tension the clamped upper heightwise of the last preparatory to inward wiping movement of the wipers.

28. In a machine for shaping uppers over lasts, a shoe rest for supporting a last with an insole and an upper thereon in bottom-down position, wipers initially extending around the toe end and along the sides, clamping means arranged releasably to clamp the outspread margin of the upper around its toe end against the wipers, grippers disposed rearwardly of said clamping means for seizing the margin of the forepart of the upper at opposite sides of the shoe bottom initially to tension the upper lengthwise of the last while the outspread margin at the toe end remains free and unclamped, mechanism for thereafter relatively moving the rest and the wipers to tension the upper heightwise of the last and to withdraw the outspread margin from said clamping means until a predetermined width of margin remains at the toe end, and means for moving the wipers inwardly of the shoe bottom, said last-mentioned means being effective to relax the grip of said grippers commencing substantially as the wipers cross the edge of the shoe bottom.

29. In a machine for shaping uppers over lasts, means for supporting a last having the upper of a shoe thereon, a pair of main wipers arranged initially to extend around the toe end of the last and along the sides thereof, these main wipers being shaped to provide confronting supporting shoulders extending lengthwise of the shoe, means for advancing and closing the main wipers to wipe the lasting margin of the upper inwardly over the shoe bottom, an auxiliary toe wiper arranged to be advanced lengthwise of the shoe on said shoulders and relatively to the main wipers to wipe inwardly over the shoe bottom in parallel relation thereto the entire extreme toe end of the lasting margin uncovered by and disposed between the main wipers, and mechanism for thereupon exerting normal to the shoe bottom a pressure on the main wipers which is also transmitted to the auxiliary wiper by said shoulders to flatten and conform the overlasted margin on the shoe bottom.

References Cited in the file of this patent

UNITED STATES PATENTS

| | | |
|---|---|---|
| 2,013,036 | De Hart | Sept. 3, 1935 |
| 2,152,855 | Ricks et al. | Apr. 4, 1939 |
| 2,221,864 | Cummings | Nov. 19, 1940 |
| 2,235,887 | Kamborian | Mar. 25, 1941 |
| 2,354,685 | Jorgensen | Aug. 1, 1944 |
| 2,423,454 | Jorgensen | July 8, 1947 |
| 2,469,467 | Jorgensen | May 10, 1949 |
| 2,505,134 | Miller | Apr. 25, 1950 |
| 2,614,275 | Jorgensen | Oct. 21, 1952 |

FOREIGN PATENTS

| | | |
|---|---|---|
| 505,562 | Great Britain | May 9, 1939 |